US012250044B2

(12) United States Patent
Vankayala et al.

(10) Patent No.: US 12,250,044 B2
(45) Date of Patent: Mar. 11, 2025

(54) METHOD AND SYSTEM FOR CHANNEL QUALITY STATUS PREDICTION IN WIRELESS NETWORK USING MACHINE LEARNING

(71) Applicant: Samsung Electronics Co., Ltd., Suwon-si (KR)

(72) Inventors: Satya Kumar Vankayala, Bangalore (IN); Anshuman Nigam, Bangalore (IN); Avinash Bhat, Bangalore (IN); Seungil Yoon, Suwon-si (KR); Shweta Madhurapantula, Bangalore (IN); Sudharsan Parthasarathy, Bangalore (IN); Abhay Kumar Sah, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 352 days.

(21) Appl. No.: 17/748,568

(22) Filed: May 19, 2022

(65) Prior Publication Data
US 2022/0278728 A1 Sep. 1, 2022

Related U.S. Application Data

(63) Continuation of application No. PCT/KR2020/016594, filed on Nov. 23, 2020.

(30) Foreign Application Priority Data

Nov. 22, 2019 (IN) .............................. 201941047831
Nov. 5, 2020 (IN) .............................. 2019 41047831

(51) Int. Cl.
H04B 7/06 (2006.01)
H04B 7/0417 (2017.01)

(52) U.S. Cl.
CPC .......... *H04B 7/0632* (2013.01); *H04B 7/0417* (2013.01); *H04B 7/063* (2013.01); *H04B 7/0639* (2013.01)

(58) Field of Classification Search
CPC ..... H04L 43/10; H04L 67/06; H04L 41/0631; H04L 41/069; H04L 41/0893;
(Continued)

(56) References Cited

U.S. PATENT DOCUMENTS 8,498,639 B2 * 7/2013 Chen ..................... H04L 1/0027
455/574
9,872,284 B2 1/2018 Brisebois et al.
(Continued)

FOREIGN PATENT DOCUMENTS

JP 2018-182405 A 11/2018
JP 2019-176254 A 10/2019
(Continued)

OTHER PUBLICATIONS

3rd Generation Partnership Project; Technical Specification Group Radio Access Network; Study on New Radio Access Technology; Radio Access Architecture and Interfaces (Release 14), 3GPP TR 38.801 V0.2.0, Jul. 1, 2020, Sophia Antipolis, France.
Indian Office Action dated Dec. 28, 2021, issued in Indian Application No. 201941047831.
(Continued)

*Primary Examiner* — Abdullahi E Salad
(74) *Attorney, Agent, or Firm* — Jefferson IP Law, LLP

(57) ABSTRACT

The disclosure relates to a communication method and system for converging a fifth-generation (5G) communication system for supporting higher data rates beyond a fourth-generation (4G) system with a technology for Internet of Things (IoT). The disclosure may be applied to intelligent services based on the 5G communication technology and the IoT-related technology, such as a smart home, a smart building, a smart city, a smart car, a connected car, health
(Continued)

care, digital education, smart retail, security and safety services. A method for predicting channel quality status (CQS) in a wireless network by a base station (BS) is provided. The method includes receiving channel quality indicator (CQI) reports, pre-coding matrix index (PMI) reports, and rank index (RI) reports of first frequency band of a plurality of frequency bands in the wireless network, storing the CQI reports, the PMI reports, and the RI reports of the first frequency band, and predicting the CQI, the PMI and the RI of a second frequency band of the plurality of frequency bands associated with the UE based on the CQI reports, the PMI reports, and the RI reports of the first frequency band.

16 Claims, 19 Drawing Sheets

(58) Field of Classification Search
CPC . H04L 41/16; H04L 63/1425; H04L 63/1416; G06N 5/04; G06N 3/08; G06N 5/01; G06N 5/022; G06N 7/01; G06N 20/00
See application file for complete search history.

(56) References Cited

U.S. PATENT DOCUMENTS

| | | |
|---|---|---|
| 10,080,159 B2 | 9/2018 | Valliappan et al. |
| 10,873,953 B2* | 12/2020 | Nammi ............... H04W 72/56 |
| 2016/0006553 A1* | 1/2016 | Kim .................... H04L 1/1864 370/252 |
| 2016/0127058 A1* | 5/2016 | Souvik ............ H04W 72/0453 370/329 |
| 2017/0346580 A1* | 11/2017 | Astrom ................ H04L 5/006 |
| 2019/0059021 A1* | 2/2019 | Corroy ................ H04W 36/22 |
| 2020/0259545 A1* | 8/2020 | Bai ..................... H04B 7/0626 |

FOREIGN PATENT DOCUMENTS

| | | |
|---|---|---|
| KR | 10-2009-0119892 A | 11/2009 |
| KR | 10-1998462 B1 | 7/2019 |
| WO | 2016/133438 A1 | 8/2016 |

OTHER PUBLICATIONS

International Search Report dated Feb. 23, 2021, issued in International Application No. PCT/KR2020/016594.

* cited by examiner

METHOD AND SYSTEM FOR CHANNEL QUALITY STATUS PREDICTION IN WIRELESS NETWORK USING MACHINE LEARNING

CROSS-REFERENCE TO RELATED APPLICATION(S)

This application is a continuation application, claiming priority under § 365(c), of an International application No. PCT/KR2020/016594, filed on Nov. 23, 2020, which is based on and claims the benefit of an Indian Provisional patent application number 201941047831, filed on Nov. 22, 2019, in the Indian Patent Office, and of an Indian Complete patent application number 201941047831, filed on Nov. 5, 2020, in the Indian Patent Office, the disclosure of each of which is incorporated by reference herein in its entirety.

BACKGROUND

1. Field

The disclosure relates to wireless communication system. More particularly, the disclosure relates to a method and a system for estimating channel quality status (CQS) information for data transmission in the wireless communication system using machine learning and artificial intelligence.

2. Description of Related Art

To meet the demand for wireless data traffic having increased since deployment of fourth-generation (4G) communication systems, efforts have been made to develop an improved fifth-generation (5G) or pre-5G communication system. Therefore, the 5G or pre-5G communication system is also called a 'Beyond 4G Network' or a 'Post long term evaluation (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and Machine-to-Machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for intelligently predicting a channel quality indicator (CQI), a pre-coding matrix index (PMI), and a rank index (RI) in a wireless communication network using machine learning.

Another aspect of the disclosure is to enable base stations to predict the CQI, the PMI, and the RI associated with the second frequency band without need of sending reference signal to a UE and receiving the CQS information report from the UE related to the second frequency band.

Another aspect of the disclosure is to enable the UE to predict the CQI, the PMI, and the RI associated with the second frequency band based on available CQI report, PMI report, and RI report related to a first frequency band.

Another aspect of the disclosure is to provide a method to intelligently predict the CQI, the PMI, and the RI associated with the second frequency band based on available the CQI report, the PMI report, and the RI report related to the first frequency band using reinforcement learning based neural network.

Additional aspects will be set forth in part in the description which follows and, in part, will be apparent from the description, or may be learned by practice of the presented embodiments.

In accordance with an aspect of the disclosure, a method for intelligently predicting a channel quality status (CQS) in a wireless communication network is provided. The method includes receiving, by a BS, one or more CQI reports, one or more PMI reports, and one or more RI reports of first frequency band of a plurality of frequency bands from UE from a plurality of UEs associated with the BS in the wireless network. The method includes storing, by the BS, one or more CQI reports, the one or more PMI reports, and the one or more RI reports of the first frequency band. The method includes predicting, by the BS, the CQI, the PMI and the RI of second frequency band of the plurality of frequency bands associated with the UE based on the one or more CQI reports, the one or more PMI reports, and the one or more RI reports of the first frequency band respectively.

In accordance with another aspect of the disclosure, a method for predicting channel quality status (CQS) in a wireless network is provided. The method includes receiving, by the UE, a request for a CQI, a PMI and a RI of a plurality of frequency bands from the BS in the wireless network. The method includes measuring, by the UE, a first CQI, a first PMI and a first RI of first frequency band of the plurality of frequency bands. The method includes predicting, by the UE, a second CQI, a second PMI, and a second RI of the second frequency band of the plurality of frequency bands based on the first CQI, the first PMI, and the first RI of the first frequency band and a plurality of network parameters. The method includes sending, by the UE, the first CQI, the first PMI, and the first RI of the first frequency band and the second CQI, the second PMI, and the second RI of the second frequency band to the BS.

In accordance with another aspect of the disclosure, a BS for predicting channel quality status (CQS) in a wireless network is provided. The BS includes a memory, a processor, and a channel quality status (CQS) estimation controller, communicatively connected to the memory and the processor. The CQS estimation controller configured to receive one or more CQI reports, one or more PMI reports, and one or more RI reports of at least one first frequency band of a plurality of frequency bands from at least one UE from a plurality of UEs associated with the BS in the wireless network, store the one or more CQI reports, the one or more PMI reports, and the one or more RI reports of the first frequency band, and predict a CQI, a PMI and a RI of second frequency band of the plurality of frequency bands associated with the at least one UE based on the one or more CQI reports, the one or more PMI reports, and the one or more RI reports of the at least one first frequency band.

In accordance with another aspect of the disclosure, a UE for predicting channel quality status (CQS) in a wireless network is provided. The UE includes a memory, a processor, a CQS estimation controller, communicatively connected to the memory and the processor. The CQS estimation controller is configured to receive a request for one or more CQI reports, one or more PMI reports, and one or more RI reports of a plurality of frequency bands from the BS in the wireless network, measure a CQI, a PMI, and a RI of a first frequency band of the plurality of frequency bands, predict at least one of a CQI, a PMI, and a RI of second frequency band of the plurality of frequency bands based on the CQI, the PMI and the RI of the first frequency band and a plurality of network parameters, and send the CQI, the PMI, and the RI of the first frequency band and the CQI, the PMI, and the RI of the second frequency band to the BS.

Through the embodiments of the disclosure, it is to provide a method and a system for intelligently predicting a channel quality indicator (CQI), a pre-coding matrix index (PMI), and a rank index (RI) in a wireless communication network using machine learning.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
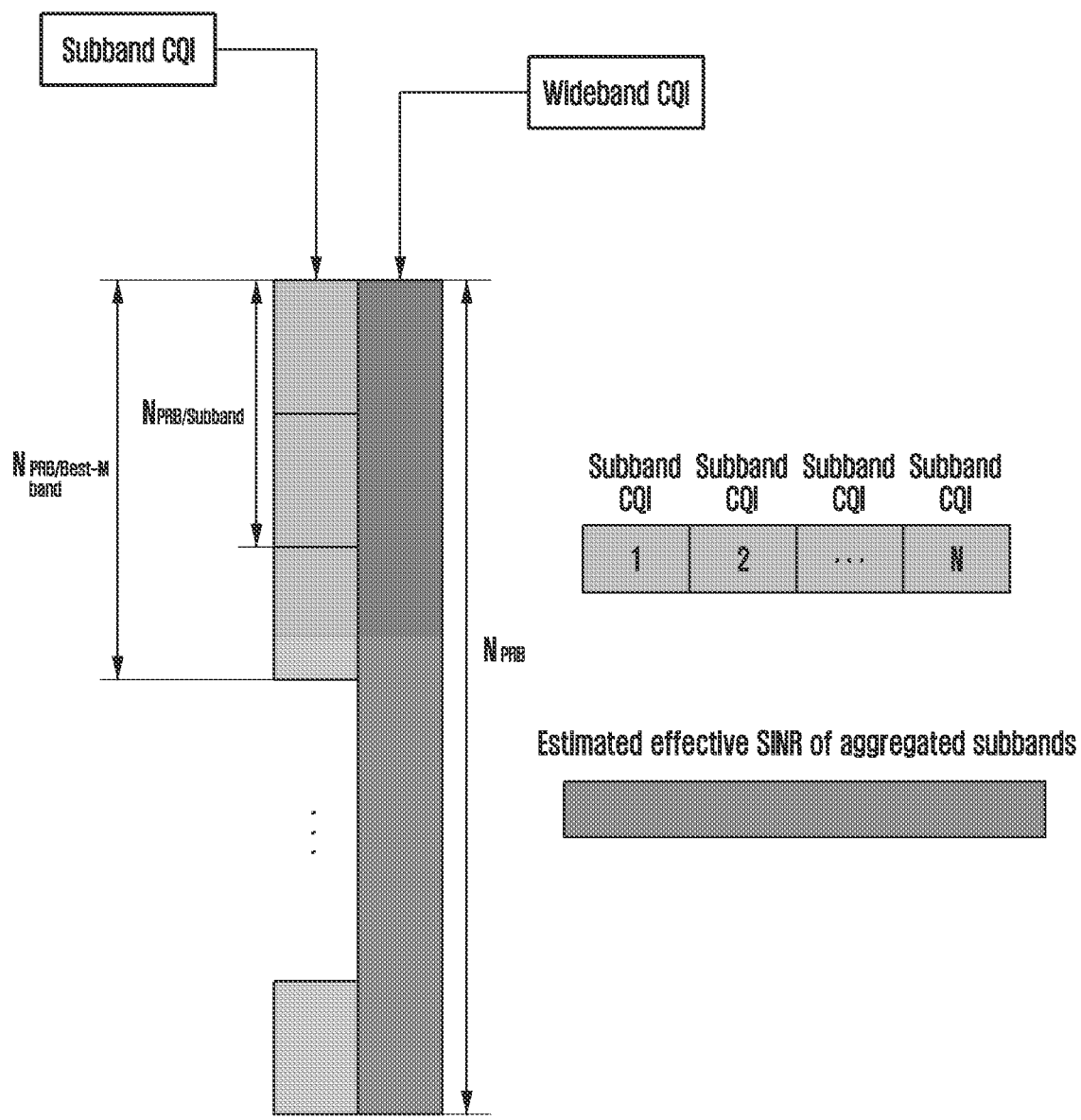
FIG. 1 illustrate different reporting modes used by a UE to report channel quality status (CQS) information to a base station according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The demand of wireless network connectivity has increased rapidly since development and deployment of fourth-generation (4G) and fifth-generation (5G) communication systems. The increased demand of 4G or 5G wireless network connectivity has also increased data traffic. In order to maintain reliable and successful data transmission, the bases stations acquire CQS information (such as channel quality indicator (CQI), pre-coding matrix (PMI), and rank index (RI)) from respective user equipment's (UEs). The UEs estimate the CQS information based on received reference signals from a 5G system, and computes the CQI, the PMI, and the RI, and conveys this CQS information to the base stations. The estimation of the CQS information consumes resources, power and time of the UE. Further, as the available bandwidth increases, such as 500 MHz or more in the 5G communication systems, the burden at the UE in computing the CQS information increases due to increase in the available frequency bands in the 5G system. Further, the time spent by the base station in sending reference signal to the UE, and receiving CQS information from the UE increases the throughput of the overall data transmission in the 4G or 5G wireless network and decreases the spectral efficiency of the 4G or 5G wireless network.

Thus, it is desired to address the above mentioned disadvantages or shortcomings or at least provide a useful alternative. In view of the above, there is a need of a system or method to reduce the computational burden at the UE related to reporting the CQS information to the base station.

Accordingly, embodiments herein disclose a method for intelligently predicting a channel quality status (CQS) in a wireless communication network. The method includes receiving, by a BS, one or more CQI reports, one or more PMI reports, and one or more RI reports of first frequency band of a plurality of frequency bands from UE from a plurality of UEs associated with the BS in the wireless network. The method includes storing, by the BS, one or more CQI reports, the one or more PMI reports, and the one or more RI reports of the first frequency band. The method includes predicting, by the BS, the CQI, the PMI and the RI of second frequency band of the plurality of frequency bands associated with the UE based on the one or more CQI reports, the one or more PMI reports, and the one or more RI reports of the first frequency band respectively.

In an embodiment of the disclosure, the first frequency band and the second frequency band is one of a sub-band, a wide band, frequency band, and a bandwidth part (BWP), and an m-band, where m>1. The "m" corresponds to how many band and band is always above 1.

In an embodiment of the disclosure, the predicting, by the BS, of the of the CQI, the PMI and the RI of the second frequency band based on the one or more CQI reports, the one or more PMI reports, and the one or more RI reports of the first frequency band and the plurality of network parameters comprises: extracting, by the BS, the plurality of network parameters from the one or more CQI reports, the one or more PMI reports, and the one or more RI reports of the first frequency band from the UE associated with the BS; and predicting, by the BS, the CQI, the PMI and the RI of the second frequency band by applying trained machine learning (ML) model with the plurality of network parameters extracted from the one or more CQI reports, the one or more PMI reports, and the one or more RI reports of the first frequency band as input to the trained ML model.

In an embodiment of the disclosure, the trained ML model corresponds to a local neural network (NN). The local NN is trained by: inputting, by the BS, the plurality of network parameters, extracted from the one or more CQI reports, the one or more PMI reports, and the one or more RI reports of the first frequency band, to an input node of the local NN; determining an optimal weight of each NN node for each BS based on a training mechanism; and training, by the BS, the local NN based on the optimal weight of each NN node of the plurality of NN nodes and the plurality of network parameters.

In an embodiment of the disclosure, the method includes determining, by the BS, the CQI, the PMI or the RI associated with a neighboring UE of the UE based on a federated learning process using machine learning (ML) model.

In an embodiment of the disclosure, the method includes receiving, by the BS, the optimal central NN from the central server; applying, by the BS, the optimal central NN to predict the CQI, the PMI and the RI of the second frequency band based on updating weights of the NN nodes of the local NN with weights of the NN nodes of the optimal central NN; determining, by the BS, whether an error function of an output of the updated local NN has one of decreased or increased after applying the optimal central NN; and sending, by the BS, a feedback related to a performance of the optimal NN model to the BS based on the determination whether the error function of the output of the updated local NN has one of decreased or increased after applying the optimal central NN.

Accordingly, embodiments of the disclosure herein disclose a method for predicting channel quality status (CQS) in a wireless network, the method includes receiving, by the UE, a request for a CQI, a PMI and a RI of a plurality of frequency bands from the BS in the wireless network. The method includes measuring, by the UE, a first CQI, a first PMI and a first RI of first frequency band of the plurality of frequency bands. The method includes predicting, by the UE, a second CQI, a second PMI, and a second RI of the second frequency band of the plurality of frequency bands based on the first CQI, the first PMI, and the first RI of the first frequency band and a plurality of network parameters. The method includes sending, by the UE, the first CQI, the first PMI, and the first RI of the first frequency band and the second CQI, the second PMI, and the second RI of the second frequency band to the BS.

Accordingly, embodiments herein disclose a BS for predicting channel quality status (CQS) in a wireless network, the BS comprising: a memory, a processor, and a channel quality status (CQS) estimation controller, communicatively connected to the memory and the processor. The CQS estimation controller configured to: receive one or more CQI reports, one or more PMI reports, and one or more RI reports of at least one first frequency band of a plurality of frequency bands from at least one UE from a plurality of UEs associated with the BS in the wireless network; store the one or more CQI reports, the one or more PMI reports, and the one or more RI reports of the first frequency band; and predict a CQI, a PMI and a RI of second frequency band of the plurality of frequency bands associated with the at least one UE based on the one or more CQI reports, the one or more PMI reports, and the one or more RI reports of the at least one first frequency band.

Accordingly, embodiments herein disclose a UE for predicting channel quality status (CQS) in a wireless network. The UE includes a memory, a processor, a CQS estimation controller, communicatively connected to the memory and the processor. The CQS estimation controller is configured to receive a request for one or more CQI reports, one or more PMI reports, and one or more RI reports of a plurality of frequency bands from the BS in the wireless network, measure a CQI, a PMI, and a RI of a first frequency band of the plurality of frequency bands, predict at least one of a CQI, a PMI, and a RI of second frequency band of the plurality of frequency bands based on the CQI, the PMI and the RI of the first frequency band and a plurality of network parameters, and send the CQI, the PMI, and the RI of the first frequency band and the CQI, the PMI, and the RI of the second frequency band to the BS.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

The terms, "NN", "ML", and "AI" are used interchangeably in the patent disclosure. The terms, "Bands" or "BWP" or "Component carriers" or "carriers" can be used interchangeably in the patent disclosure. The terms "BS" or "cell" or "gNodeB" or "eNodeB" or "remote radio head (RRH)" or "radio unit (RU)" can be used interchangeably in the patent disclosure.

Accordingly, embodiments herein achieve a method for predicting channel quality status (CQS) in a wireless network. The method comprising: receiving, by a BS, one or more CQI reports, one or more PMI reports, and one or more RI reports of first frequency band of a plurality of frequency bands from UE from a plurality of UEs associated with the BS in the wireless network. The method further includes storing, by the BS, the CQI reports, the one or more PMI reports, and the one or more RI reports of the at least one first frequency band. The method further includes predicting, by the BS, the CQI, the PMI and the RI of second frequency band of the plurality of frequency bands associated with the at least one UE based on the one or more CQI reports, the one or more PMI reports, and the one or more RI reports of the first frequency band respectively.

In the existing method, whenever the BS needs to transmit data signal or communication signal using downlink or uplink signals, the BS needs to first send a reference signal and the UE needs to compute channel quality status (CQS) information related to the frequency bands in which the BS will communicate to the UE according to the received reference signal, thus the existing methods decreases spectral efficiency of the overall transmission and also increases resource consumption, and power consumption at the UE to compute the CQS information.

Unlike methods and systems of the related art, the proposed method can be used to predict at least one of a CQI, a PMI, and a RI associated with at least one second frequency band without need of sending reference signal to a user equipment and receiving a CQS information report from the UE related to the at least one second frequency band. The CQS information report related to the at least one second frequency band is predicted based on the CQS information report related to the at least one first frequency band.

According to embodiments herein provide a method to intelligently predict at least one of the CQI, the PMI, and the RI associated with at least one second frequency band based on available CQI report, a PMI report, and a RI report related to at least one first frequency band using machine learning.

The proposed method can be implemented in distributed unit or centralized unit or cloud intelligence unit or remote radio head (RRH) or radio unit (RU). Further, the proposed method can be used in a communication system. The communication system can be, for example, but not limited to a 4G system, 5G system, 6G system, Wi-Fi system, and LAA system. The proposed method can be used for various NN/ML/RL architecture based on various or sub-set of network parameters. In an example, for voice application, the proposed method can use one NN/ML/AI trained module and browsing application, the proposed method can use different NN/ML/AI trained module. Further, the BS can maintain a NN/ML/AI on per UE or per Beam or per BWP or per Band basis.

Further, the system can also use deep NN (DNN), a convolution NN (CNN), recurrent NN (RNN), sparse NN (SNN), or an artificial NN (ANN), sparse CNN, sparse RNN, sparse DNN and hybrid architectures. Further, the system can also use various activation functions, approximation of activation functions and/or linear approximation of activation functions. For example, one can use Markov decision process (MDP) based algorithms, such as modified value iteration or policy iteration. The performance will be function of the activation function. One can approximate the activated functions to reduce the computational complexity. Further, the system can also intelligently remove the connections in the NN network if the weight of the link is negligible and again the system can retrain the NN to achieve the expected performance. In case, if performance does not meet the requirement, the system will go back earlier NN. Further, the system can use ML/AI to improve the performance of these algorithms. The person ordinary skill in the area can easily do slight modifications to the proposed solutions. These techniques can run in ML module or can run in hardware (HW).

Referring now to the drawings, and more particularly to FIGS. 2 to 13, 14A to 14D, 15, and 16, where similar reference characters denote corresponding features consistently throughout the figures, there are shown preferred embodiments.

FIG. 1 illustrates different reporting modes used by a UE to report channel quality status (CQS) information to the base station according to the related art.

Referring to FIG. 1, the UE may report CQS information to the BS according to three different reporting modes: a) wideband reporting b) sub-band reporting and c) best-M band reporting.

According to the existing methods, there are several CQS information indicators in long term evaluation (LTE). The CQI, PMI and RI are few of them reported by the UE to the BS in uplink direction. According to existing methods, the UE may be controlled by the BS to periodically or aperiodically for measuring or monitoring the CQS information (such as the CQI, the PMI and the RI), and reporting the CQS information to the BS. The RI indicates the number of layers used for downlink transmission, and the PMI indicates which precoding matrix to be used for downlink, and the PMI matrix is determined by RI. The UE estimates channel quality (typically signal-to-interference-plus-noise ratio, or SINR) from channel sounding, and computes a preferred PMI, RI, and CQI. The UE may use an uplink control channel for periodic reporting and use an uplink data channel for aperiodic reporting.

The BS performs scheduling based on CQSs reported by UEs to determine how to allocate physical channel resource blocks to individual UEs, and notifies per-UE allocation information to the individual UEs. Basically the CQS information in the LTE is calculated for the downlink channel by the UE and the UE does this mostly by estimating the channel quality using the downlink cell specific reference signal. The UE calculates the SINR based on the strength of the reference signal and UE refers to a look up table as to tell what SINR maps to what CQI, PMI or the RI. Once the determination of channel parameters is complete by the UE, the UE reports the CQS information over physical uplink control channel (PUCCH) or physical uplink shared channel (PUSCH) to the BS. There could be UE specific implementation, where the UE manufacturer can decide if the user of the UE wants to back-off the CQS to be reported based on CRC failures on downlink etc.

Accordingly, the UE reports the CQS information with respect to received reference signal from the BS in one of the three reporting modes as discussed above. In the wideband reporting, the UE determines an average CQS information (such as average CQI, average PMI or average RI) for the complete frequency bandwidth available for UE, and accordingly send the average CQS information to the BS. The sub-band reporting is mainly applicable for 5G communication systems where the overall frequency bandwidth is divided into multiple bandwidth parts (BWPs). Therefore, in the sub-band reporting, the UE determines CQS information specific to each sub-band and report the CQS information specific to each sub-band to the BS. The advantage of sub-band reporting is more accurate reporting of channel conditions are provided using the sub-band reporting. Further, the best-M band reporting includes reporting of CQS information of only those M frequency bands out of the N frequency bands whose channel condition is best out of the N frequency bands.

The CQI accepts discrete values between 0 and 15. The spectral efficiency and modulation and coding scheme (MCS) value for respective discrete value of CQI is shown in below Table 1 (for 4G communication systems). Further spectral efficiency and modulation and coding scheme (MCS) value for 5G communication systems are shown in Table 2.

TABLE 1

| CQI Index | Modulation | Code rate * 1024 | Efficiency |
|---|---|---|---|
| 0 | | Out of Range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |

TABLE 1-continued

| CQI Index | Modulation | Code rate * 1024 | Efficiency |
|---|---|---|---|
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| MCS Index | Modulation order | Code rate * 1024 | Spectral Efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4602 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | | the both the given tables indicates that better the CQI, better will be the spectral efficiency (i.e., a transmission rate) of the communication system. Therefore accurate determination of CQI, PMI, and RI improves the spectral efficiency of the overall communication system. As moving towards the next generation 5G/6G systems, total bandwidth is expected to increase than the existing 4G/5G will be more than 100 MHz. According to existing methods, the UE has to measure the CQI values, the PMI values and the RI values for 100s of sub-bands. This will tremendously increase power consumption, resource consumption, and time consumption of the UE in estimating the CQS information. Further, the dependency of BS on UE for the CQS reporting increases latency of the overall communication system.

Therefore, the proposed method in the disclosure predicts the CQI, the PMI and the RI for at least one second frequency band based on the CQI, the PMI and the RI reports received for at least one first frequency band which is different from the at least one second frequency band. The prediction is done using trained machine learning model, such as an RL based neural network.

Further, different steps involved in implementation of the RL based neural network for predicting CQI, the PMI and the RI for at least one second frequency band based on the CQI, the PMI and the RI reports received for at least one first frequency band are explained in the FIGS. 2 to 13, 14A to 14D, and 15.

Figure 2:
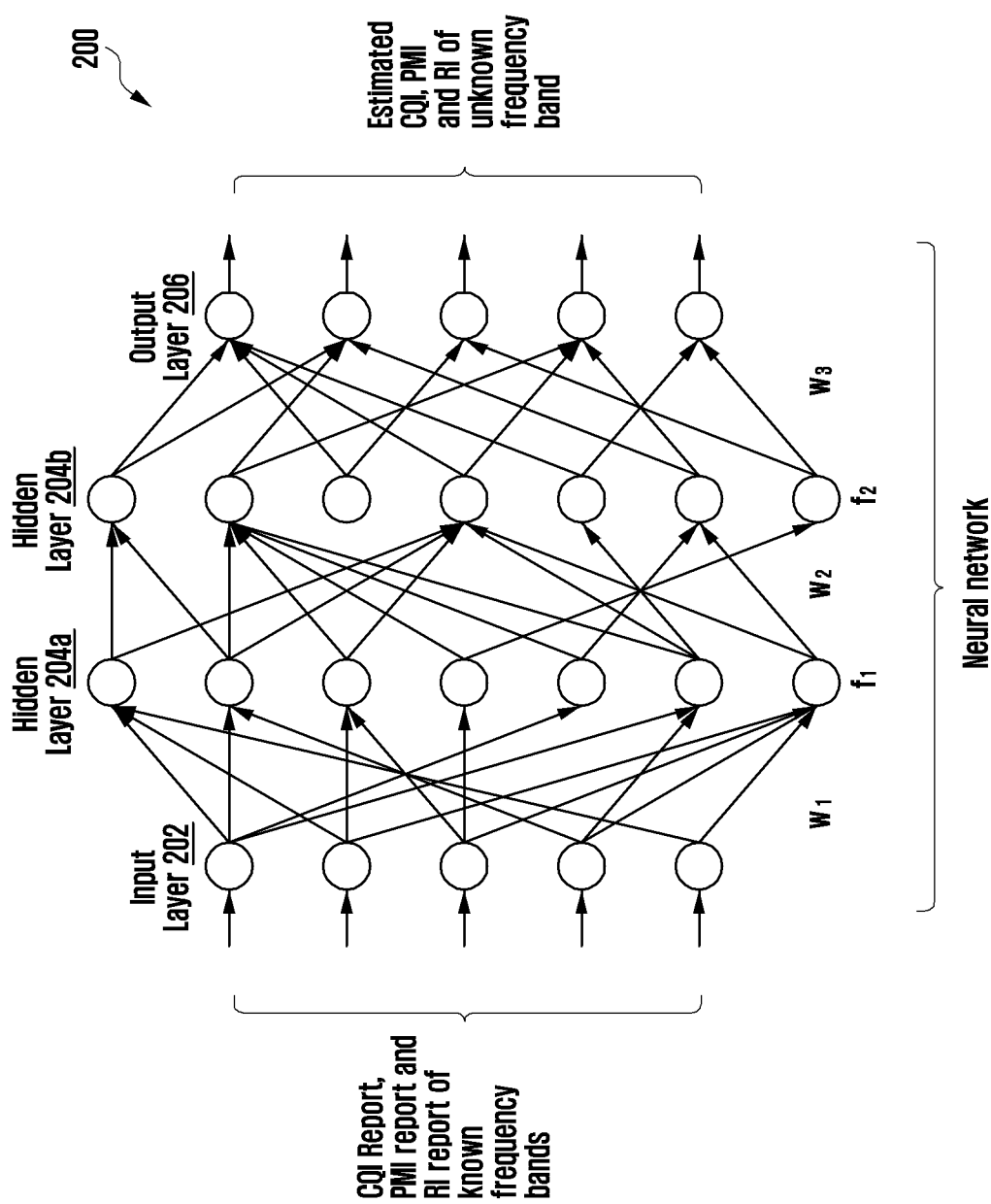
FIG. 2 illustrates a neural network diagram for predicting CQS information related to unknown frequency bands according to an embodiment of the disclosure.

FIG. 2 illustrate a neural network diagram (200) for predicting CQS information related to unknown frequency bands according to an embodiment of the disclosure.

The neural network shown in FIG. 2 is an RL based trained neural network which is trained using training data sets and after achieving a desired accuracy in generating desired output is deployed for testing. The neural network may be deployed both at the BS and at the UE for predicting the CQS information related to unknown frequency bands. The trained neural network includes an input layer (202), one or more hidden layers (204a and 204b) and an output layer (206). Optimal weights are assigned to each layer of the trained NN such that an error function of the output of the trained NN is below a threshold error value. The threshold error value is predefined or user defined value.

Referring to FIG. 2, one or more CQI reports, one or more PMI reports and one or more RI reports associated with at least one first frequency band are fed as input to the input layer (202) of the neural network (NN). The NN is configured to extract different network parameters from the received one or more CQI reports, one or more PMI reports and the one or more RI reports. The plurality of network parameters comprises, but not limited to, at least one of a CQI range, a number of UEs within a range of the BS, a type of the BS, a beam index of the BS, a mode of operation of the BS, a frequency of operation of the UE, a bandwidth parts associated with the UE, a time division duplexing (TDD) operation the neighboring BSs, a dynamic TDD, a frequency division duplexing (FDD) operation of the neighboring BSs, a free Wi-Fi band of operation of the neighboring BSs, a non-Wi-Fi band of operation of the neighboring BSs, a load of the neighboring BSs, a transmission mode of the UE, a number of antennas associated with the UE, number of the BS antennas, a full duplex mode of the BS, a half-duplex mode of the BS, a non-orthogonal multiple access (NOMA) mode of the BS, a non-NOMA mode of the BS, a time of the day, a type of the wireless network, a UE category, a location of the UE (502a), a number of neighboring UEs of the UE, an operating frequency of the neighboring UEs of the UE, at least one system parameter of the neighboring UEs, a coherence bandwidth, a coherence time, a sub-carrier spacing, a maximum transmitting power of the BS, a maximum transmitting power of the UE, a frequency re-use factor of various frequency bands/BWP, a quality of service (QoS), and a QoS class identifier (QCI).

The plurality of network parameters further comprises at least one of climatic condition information, information related to special occasion on the day, a density of UEs within a region of the BS, an information related to UEs' distribution within the region of the BS, a battery level of the UE, a manufacturing company of the UE, or a components manufacturing company details of the UE.

Further, the network parameters can be updated either periodically or aperiodically or on request basis or a demand basic. The learning can be translated into offline or rule based formulas. Even BS (504) can run the ML/AI techniques periodically or aperiodically. For example if the error is more than x % then re-learning can be done. Even, the BS (504) can request for other BSs NN/ML/AI. The BS (504) can apply one UE learning on other UEs intelligently exploiting the characteristics, such as location information, beam information, UE capabilities, UE transmission, UE type and other wireless parameters etc. even sub-set of parameters can be used to learn. These learning can be done across the BWPs or Bands etc.

The techniques can be run whenever block error ratio (BLER) performance gets deteriorated.

The predicted CQI can be used for resource allocation or interference estimation or QoS/QCI management. The method can utilize the location information from L2, L3 and higher layer to improve the performance of the ML techniques. One can consider load of the other cells, BS topology, expected interference information, coverage area holes, coverage maps, MCS maps, traffic maps. One can use this information either real time or near real time basis. Some of the parameters will be available on non-real time basis, i.e., with different periodicity. Each parameter can have different periodicity.

The trained NN is configured to extract the plurality of network parameters associated with the one or more CQI reports, the one or more PMI reports and the one or more RI reports associated with the at least one first frequency band, and each extracted network parameter is considered as an input element to an input layer (202) of the trained NN.

The trained NN is configured to predict one or more CQI reports, one or more PMI reports and one or more RI reports associated with at least one second frequency band based on the plurality of network parameters associated with the one or more CQI reports, the one or more PMI reports and the one or more RI reports of the at least one first frequency band. The at least one second frequency band is different from the at least one first frequency band.

Figure 3:
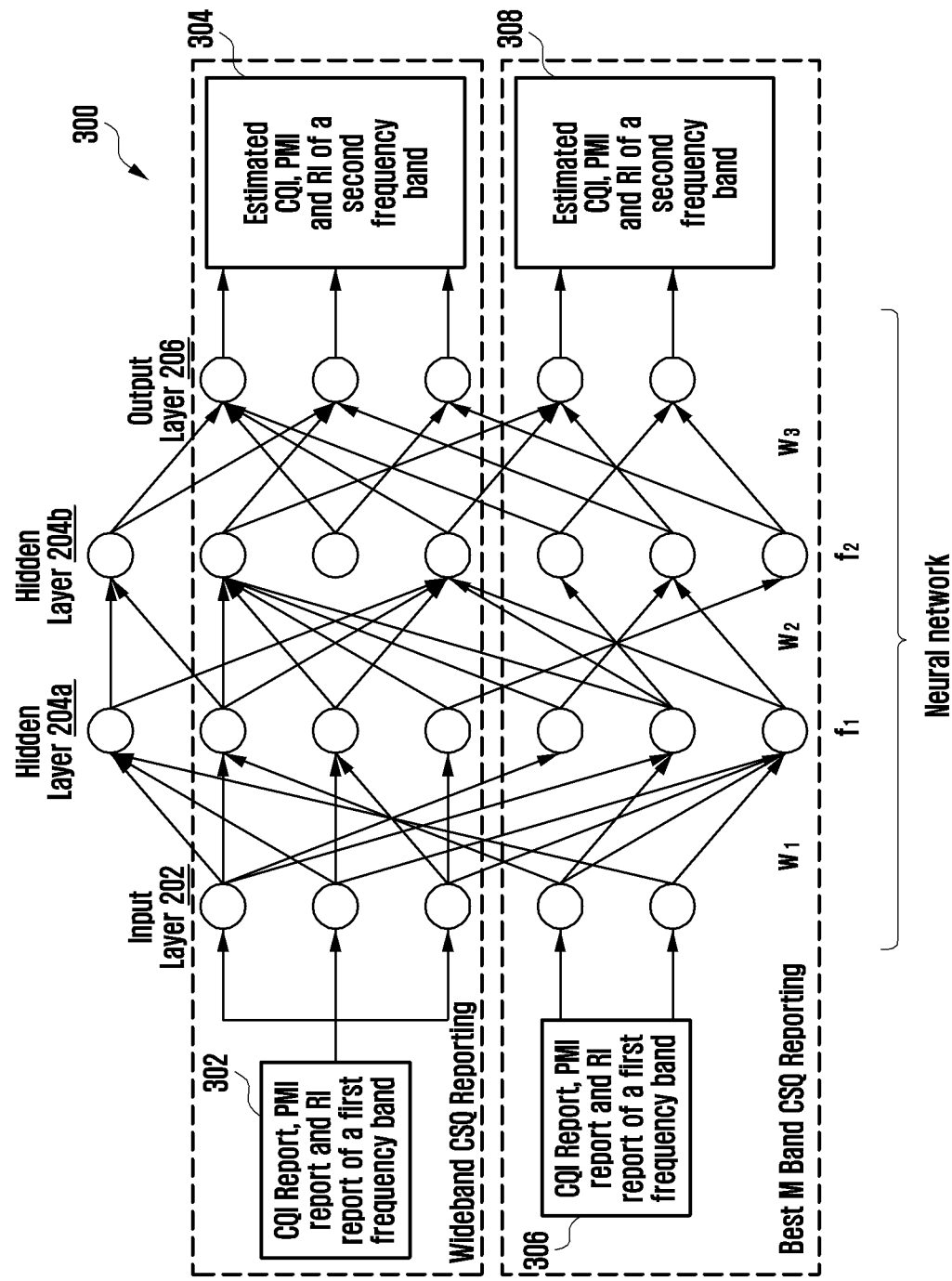
FIG. 3 illustrates a neural network diagram for predicting CQS information related to unknown frequency bands for both wideband CQS reporting and best-M band CQS reporting according to an embodiment of the disclosure.

FIG. 3 illustrates a neural network diagram for predicting CQS information related to unknown frequency bands for both wideband CQS reporting and best-M band CQS reporting according to an embodiment of the disclosure.

Referring to FIG. 3, the one or more CQI reports, the one or more PMI reports and the one or more RI reports of the at least one first frequency band can be reported by the UE to the BS in either wideband reporting mode or best-M band (interchangeable be referred as "m-band") reporting mode. The one or more CQI reports, one or more PMI reports and one or more RI reports associated with at least one first frequency band are fed as input (302, 306) to the input layer (202) of the neural network (NN). The NN is configured to extract different network parameters from the received one or more CQI reports, one or more PMI reports and the one or more RI reports of the at least one first frequency band. The trained NN is further configured to predict and output (304, 308) one or more CQI reports, one or more PMI reports and one or more RI reports associated with at least one second frequency band based on the plurality of network parameters associated with the one or more CQI reports, the one or more PMI reports and the one or more RI reports of the at least one first frequency band.

Figure 4:
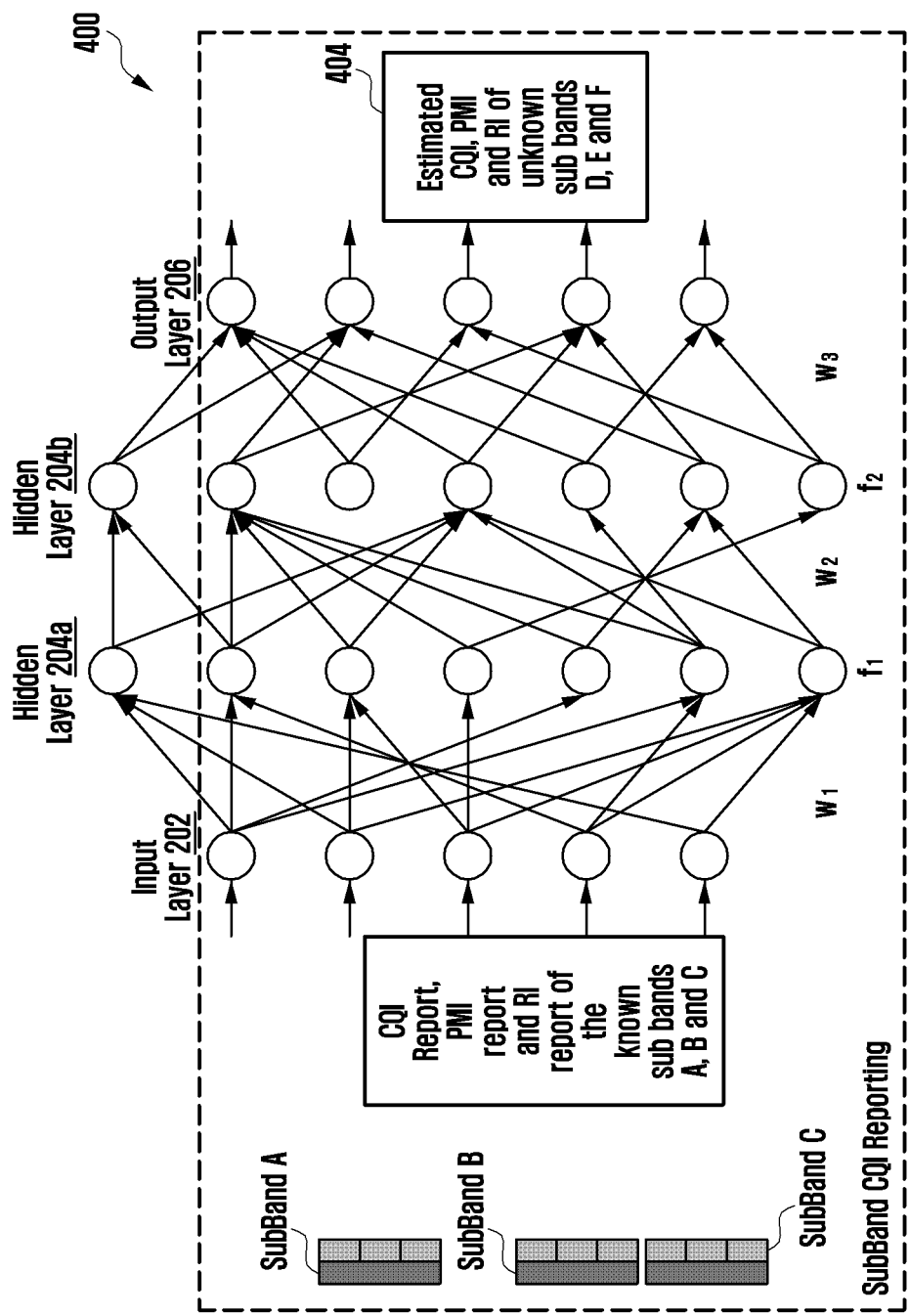
FIG. 4 illustrates a neural network diagram for predicting CQS information related to unknown frequency bands for sub-band CQS reporting according to an embodiment of the disclosure.

FIG. 4 illustrates a NN diagram (400) for predicting CQS information related to unknown frequency bands for sub-band CQS reporting according to an embodiment of the disclosure.

Referring to FIG. 4 the one or more CQI reports, the one or more PMI reports and the one or more RI reports of the at least one first frequency band can be reported by the UE to the BS in a sub-band reporting mode. In a non-limiting example embodiment of the disclosure, there are six sub-bands (sub-band A, sub-band B, sub-band C, sub-band D, sub-band E and sub-band F) allocated to the UE and the UE reports the CQS information (i.e., the one or more CQI reports, the one or more PMI reports and the one or more RI reports) related to three sub-bands (sub-band A, sub-band B, sub-band C) out of the allocated six sub-bands. The CQI reports, the one or more PMI reports and the one or more RI reports related to three sub-bands (sub-band A, sub-band B, sub-band C) are given as input (402) to the trained NN. The trained NN is configured to determine the CQS information (i.e., the one or more CQI reports, the one or more PMI reports and the one or more RI reports) related to the remaining sub-bands (sub-band D, sub-band E and sub-band F) of the allocated six sub-bands other than the three sub-bands (sub-band A, sub-band B, sub-band C) whose CQS information is received. The trained NN is configured to determine the CQS information related to the remaining sub-bands (sub-band D, sub-band E and sub-band F) based on extracted plurality of network parameters associated with the CQS information (i.e., the one or more CQI reports, the one or more PMI reports and the one or more RI reports) related to the three sub-bands (sub-band A, sub-band B, sub-band C). The CQS information related to the remaining sub-bands (sub-band D, sub-band E and sub-band F) is the output (404) of the trained NN.

Figure 5:
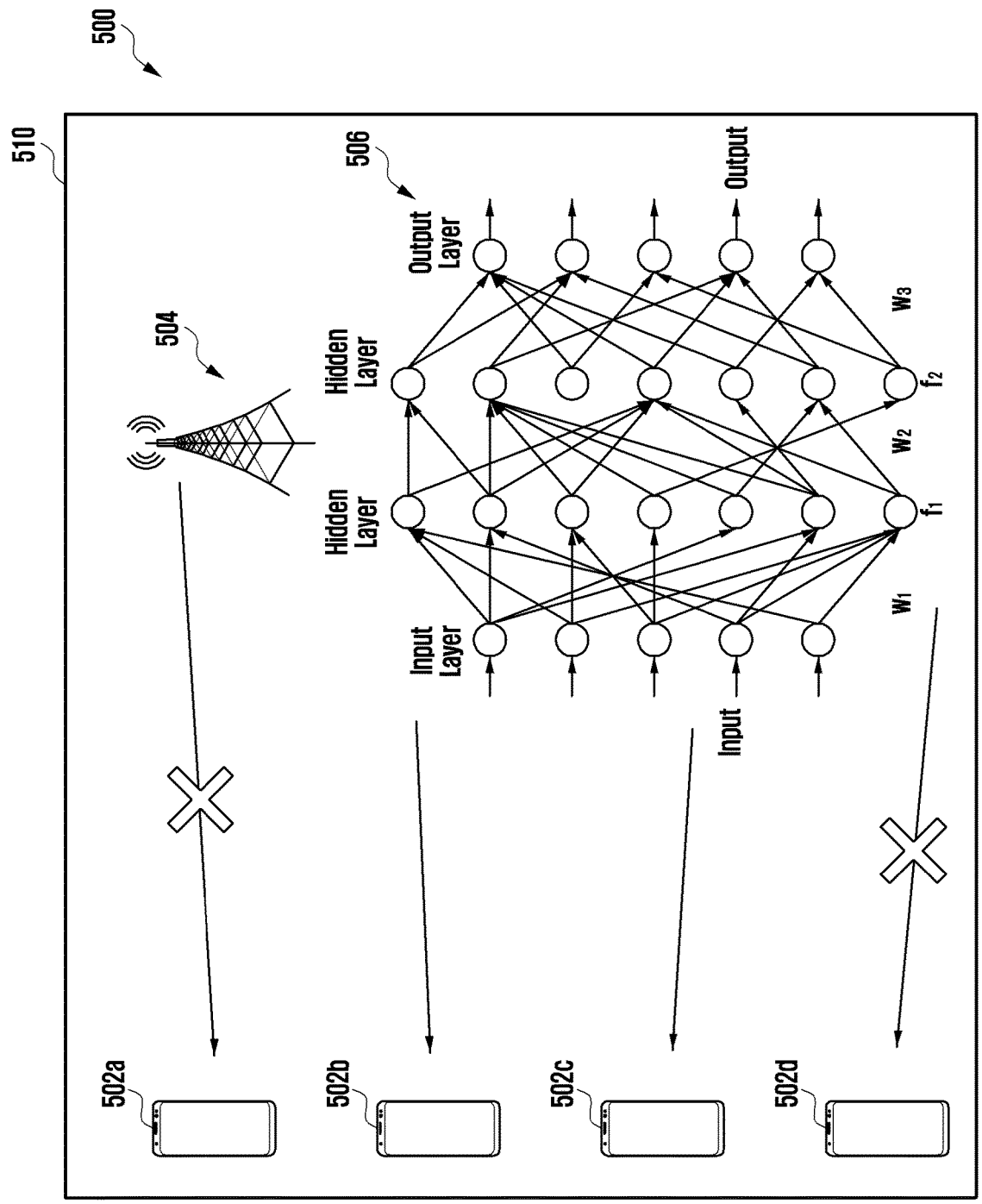
FIG. 5 illustrates a network diagram for predicting CQS information related to unknown frequency bands for a number UEs based on received CQS information from other than a number UEs using neural network according to an embodiment of the disclosure.

FIG. 5 illustrates a network diagram (500) for predicting CQS information related to unknown frequency bands for a first number UEs based on received CQS information from UEs other than a first number UEs using NN in a wireless network (510) according to an embodiment of the disclosure.

Referring to FIG. 5, UE (502a), UE (502b), UE (502c), and UE (502d) are communicating with a BS (504). The UE (502b) and the UE (502c) reports CQS information to the BS (504). The BS (504) includes the trained NN (506) and accordingly predicts the CQS information using the trained NN (506), and further communicates with the UE (502a) using the predicted CQS information without need of sending request for reporting CQS information to the UE (502a)-(502d). The UE (502a), UE (502b), UE (502c), and UE (502d) may also be considered as neighboring UEs to each other. The BS may also use federated machine learning in order to predict CQS information for neighboring UEs UE (502b), UE (502c), and UE (502d) without need of asking CQS information from the UE (502a). The trained NN is further explained in FIG. 6.

Figure 6:
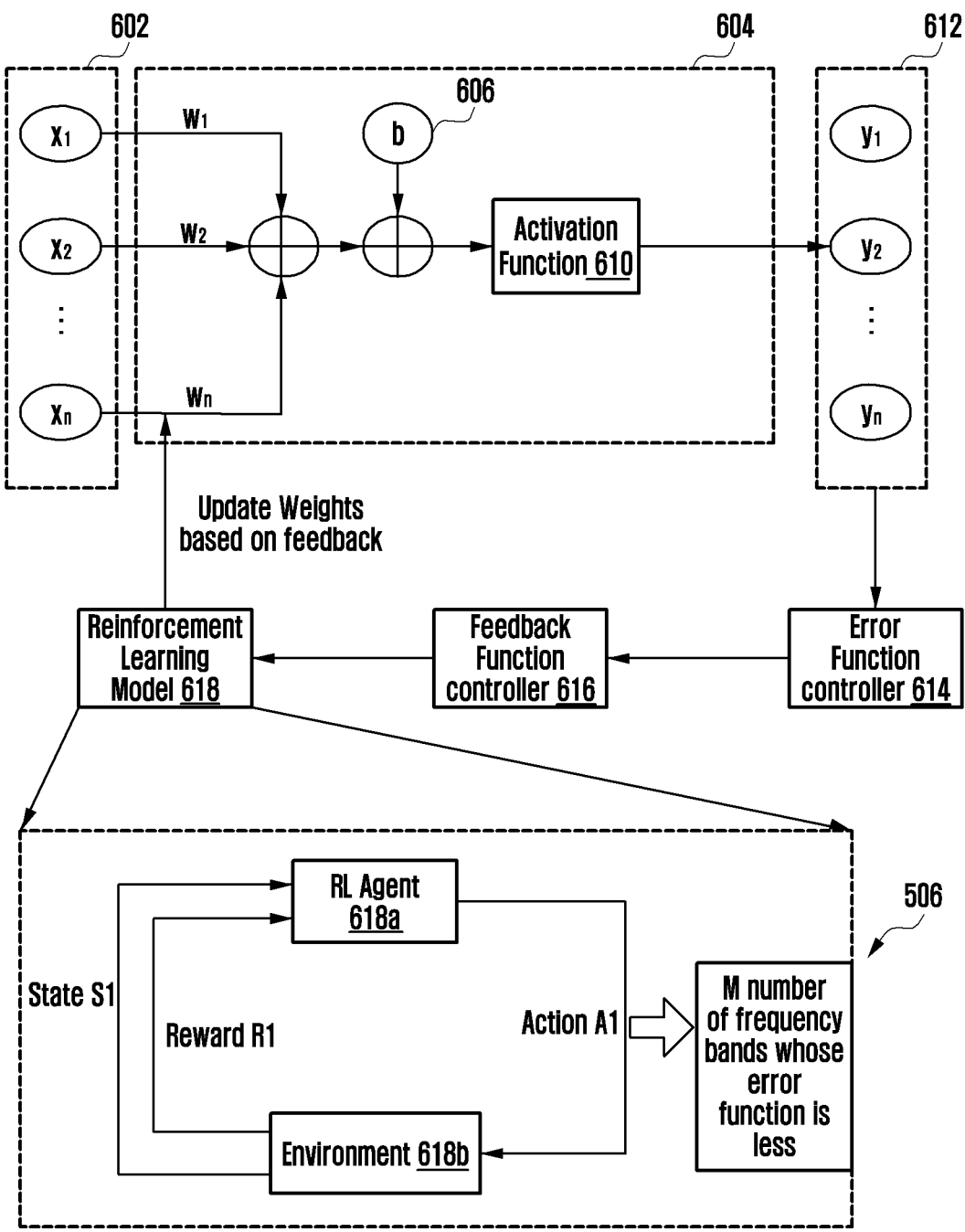
FIG. 6 illustrates a component level diagram of a reinforcement learning (RL) based neural network for predicting CQS information related to unknown frequency bands, according to an embodiment of the disclosure.

FIG. 6 illustrates a component level diagram of trained NN (506) for predicting CQS information related to unknown frequency bands according to an embodiment of the disclosure. In an embodiment of the disclosure, the method can maintain different NN/ML/AI modules for different users or Single NN/ML/AI for set of users. The user classification can be done various parameters, such as QCI or/and QoS or/and MCS or/and location other network or UE parameters.

Referring to FIG. 6, the trained NN (506) is a reinforcement learning (RL) based NN (hereinafter may also interchangeably referred as "trained RL based local NN (506) or trained local NN (506)". The trained NN (506) may comprises a deep NN (DNN), a convolution NN (CNN), recurrent NN (RNN), sparse NN (SNN), or an artificial NN (ANN).

The trained NN (506) comprises an input layer (602), a hidden layer (604), an output layer (612), an error function controller (614), a feedback function controller (616), and an RL model (618). The RL model (618) further comprises an RL agent (618a) which is interacting with an environment (618b). According to an embodiment of the disclosure, the RL agent (618a) is the trained NN (506) and the environment (618b) is the communication between the BS (504) and the UEs (502a), (502b), (502c), and (502d) for reporting of the CQS information.

The hidden layer (604) of the trained NN (506) comprises optimal weights assigned to multiple layers (including the input layer (602), one or more hidden layers (604) and the output layer (612)) of the trained NN (506), a bias (606), and an activation function (610). The different layers of the NN (506) include plurality of NN nodes, therefore the layers of the NN (506) may also be refereed as "NN nodes" of the trained NN (506).

In an embodiment of the disclosure, the NN (506) is operable in two operating modes: a) training mode and b) testing mode. In the training mode, the NN (506) act as the RL agent (618a) and learns to predict the CQS information related to unknown frequency bands by interacting with the environment (618b). For every interaction with the environment (618b), the NN (506) generates an output which is given to the error function controller (614) to determine an error function of the output generated by the NN (506), and whether the generated output is less than a threshold error value or not. The output of the error function controller (614) is provided to the feedback function controller (616) which is configured to provide feedback to the RL model (618) as form of rewards based on performance of the NN (506). The RL model (618) receives the feedback and accordingly updates the weights assigned to each layer of the NN (506) to achieve minimum error function. The RL model (618) further incorporates the rewards and accordingly updates its policy function and value function to enhance performance of the NN (506). The NN (506) is under training until an error function of the output (612) of the NN (506) is less than a threshold error value. The threshold error value is predefined or user defined value.

Upon sufficient training the NN (506), via the RL model (618), becomes capable of predicting the CQS information related to unknown frequency bands, and the RL model (618) becomes capable of determining for which frequency bands the error function will be minimum.

Once the NN (506) is trained enough to accurately predict the CQS information related to the unknown frequency bands based on available CQS information related to the known frequency bands, the operating mode of the NN (506) is switched to the testing mode. In the testing mode of the NN (506), one or more CQI reports, one or more PMI reports, and one or more RI reports are given as input to the NN (506). During the testing mode if the RL model (618) determines that the error function of the output of the trained NN (506) exceeds the threshold error value, it sends a negative feedback and accordingly the mode of operation of the NN (506) may be switched back to training mode until the desired output (error function less than or equal to the threshold error value) is achieved. A reason for the NN (506) to predict the output with more error function could be change in environment (618b) of the UEs (502a), (502b), (502c), and (502d) and the new environment (618b) of the UEs (502a), (502b), (502c), and (502d) is not known to the trained NN (506) therefore the NN (506) needs to learn and update according to the changed environment (618b) of the UEs (502a), (502b), (502c), and (502d).

In a non-limiting embodiment of the disclosure, the activation function used in the NN (506) is a rectified linear unit (ReLu) activation function. However, other activation function can also be used, such as unit step, signum, linear regression, piece-wise linear, hyperbolic tangent, logistic (sigmoid), rectifier softplus, etc.

The training of the NN (506) is conducted based on at least one of a belief propagation, a back-propagation or an adaptive learning optimization (Adam).

Figure 7:
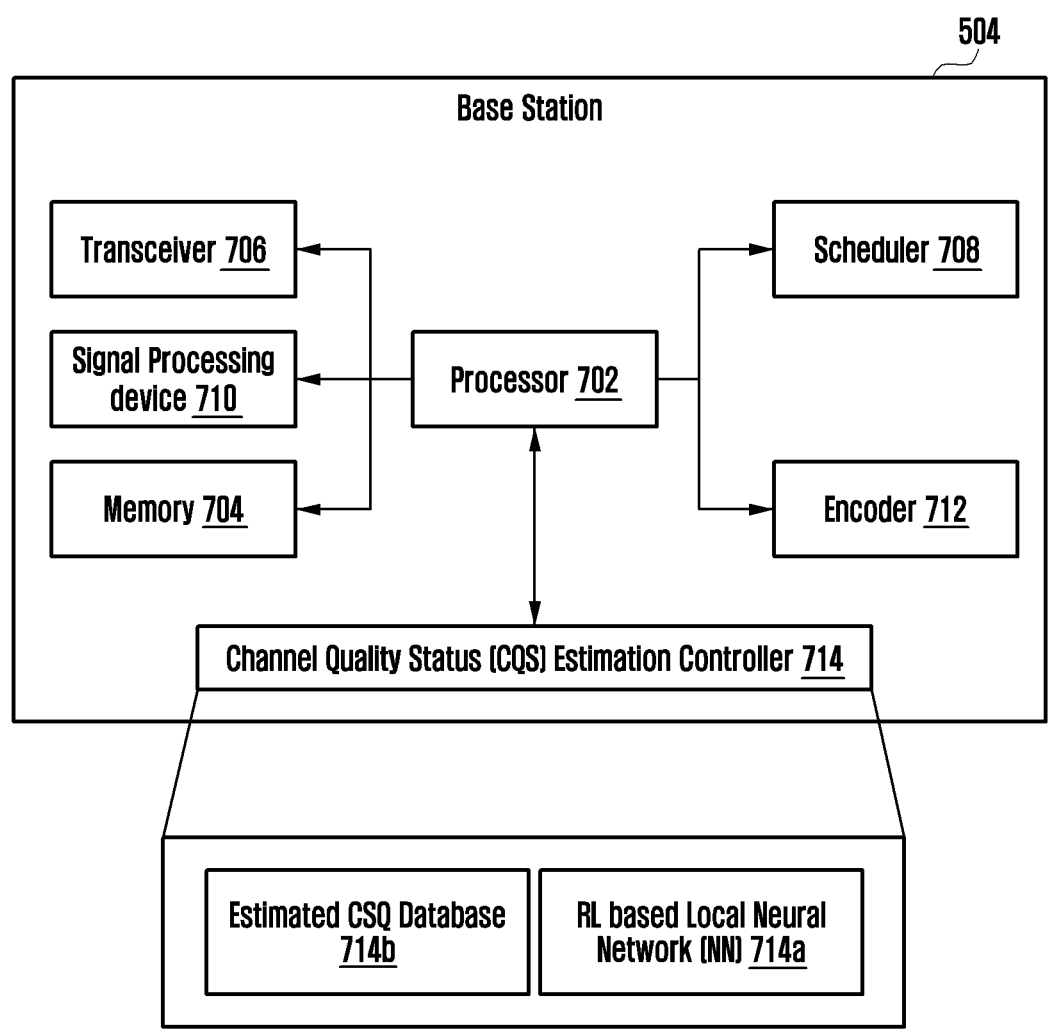
FIG. 7 illustrates a hardware component diagram of a base station for predicting CQS information related to unknown frequency bands, according to an embodiment of the disclosure.

FIG. 7 illustrates a hardware component diagram of a base station (504) for predicting CQS information related to unknown frequency bands according to an embodiment of the disclosure. The base station is an example of the BS (504) shown in FIG. 5.

Referring to FIG. 7, the BS (504) comprises a processor (702), a memory (704), a transceiver (706), and a scheduler (708), a signal processing device (710), an encoder (712), and a CQS estimation controller (714). The CQS estimation controller (714) includes an estimated CQS database (714b) and an RL based local NN (714a). The RL based local NN (714a) is an example of the NN (506). The components of the BS (504) provided herein may not be exhaustive and that the BS (504) may include more or fewer components than that of depicted in FIG. 7. Further, two or more components may be embodied in one single component, and/or one component may be configured using multiple sub-components to achieve the desired functionalities. Some components of the BS (504) may be configured using hardware elements, firmware elements and/or a combination thereof.

The processor (702) is coupled with the memory (704), the transceiver (706), the scheduler (708), the signal processing device (710), the encoder (712), and the CQS estimation controller (714). The processor (702) is configured to execute instructions stored in the memory (704) and to perform various processes. The transceiver (706) is configured for communicating internally between internal hardware components and with external devices via one or more networks. The processor (702) may include one or more processing units (e.g., in a multi-core configuration).

The memory (704) stores instructions to be executed by the processor (702). The memory (704) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (704) may, in some examples, be considered a non-transitory storage medium. The term "non-transitory" may indicate that the storage medium is not embodied in a carrier wave or a propagated signal. However, the term "non-transitory" should not be interpreted that the memory (704) is non-movable. In certain examples, a non-transitory storage medium may store data that can, over time, change (e.g., in random access memory (RAM) or cache).

In an embodiment of the disclosure, the processor (702) is configured to determine a CQS information related to unknown frequency bands while communicating to the UE (502a). The processor (702) is further configured to receive, with the help of the transceiver (706), one or more CQI reports, one or more PMI reports and one or more RI reports associated with at least one first frequency band (may also referred as "known frequency band"). The processor (702) is further configured to extract, with the help of the signal processing device (710), the plurality of network parameters associated with the one or more CQI reports, one or more PMI reports and one or more RI reports of the at least one first frequency band. The signal processing device (710) performs functions, such as modulation, filtering, noise cancellation to extract useful data from the received input data at the BS (504). Upon extracting the plurality of network parameters associated with the one or more CQI reports, one or more PMI reports and one or more RI reports of the at least one first frequency band, the processor (702) is configured to determine CQI, PMI and RI of at least second frequency band (may also referred as "unknown frequency bands") using the CQS estimation controller (714). The CQS estimation controller (714) is configured to predict the CQI, the PMI and the RI of at least second frequency band using the RL based local NN (714a) and further configured to store the estimated CQI, the estimated PMI and the estimated RI as estimated CQS in the estimated CQS database (714b). The CQS estimation controller (714) is configured to predict the CQI, the PMI and the RI of at least second frequency band using the RL based NN (714a) based on inputting the plurality of network parameters, extracted from the at least one of the one or more CQI reports, the one or more PMI reports, and the one or more RI reports of the at least one first frequency band, to a plurality of NN nodes of the RL based local NN (714a), determining an optimal weight of each NN node for each BS based on a training mechanism, and training the RL based local NN (714a) based on the optimal weight of each NN node of the plurality of NN nodes, and the plurality of network parameters. The optimal weight corresponds to a weight corresponding to which the error function of the RL based local NN (714a) is less than a threshold value. The threshold value is predefined or user defined value. The training used for training the RL based local NN (714a) is at least one of a belief propagation, a back-propagation or an adaptive learning optimization (Adam, adaptive moment estimation).

The CQS estimation controller (714) is also configured to receive an optimal central NN (808b) from a central server (800) associated with the BS (504) and the UE (502a). The CQS estimation controller (714) is also configured to apply the optimal central NN (808b) to predict the CQI, the PMI and the RI of the at least one second frequency band based on updating weights of the layers of the RL based local NN (714a) with weights of the layers of the optimal central NN (808b). The CQS estimation controller (714) is further configured to determine whether an error function of an output of the updated RL based local NN (714a) decreased after applying the optimal central NN or not. If the error function of the updated RL based local NN (714a) has decreased then, the BS (504) sends a positive feedback to the central server (800). Otherwise, the BS (504) sends a negative feedback to the central server (800).

In an embodiment of the disclosure, the predicted CQI, PMI and RI of at least the second frequency band are provided to the scheduler (708). The scheduler (708) is configured to allocate resource to the UE for uplink and downlink communication and also send grants. Based on the predicted CQI, PMI and RI of at least second frequency band, the scheduler (708) determines appropriate number of resource blocks to be allocated to the UE (502a) and a MCS value for the communication between the BS (504) and the UE (502a). Upon determination of the number of resource blocks to be allocated to the UE (502a) and the MCS value, the Encoder (712) is configured to generate encoded control signal and data signal to be sent to the UE (502a) via downlink.

The embodiments disclosed herein can be implemented using at least one hardware device and performing network management functions to control the elements.

It shall be noted that although a single BS (502) is illustrated and explained in the specification but a person skilled in the art would appreciate the fact that more than one BS and more than one UE can also be present in the wireless network (510) without deviating from the scope of the disclosure.

Figure 8:
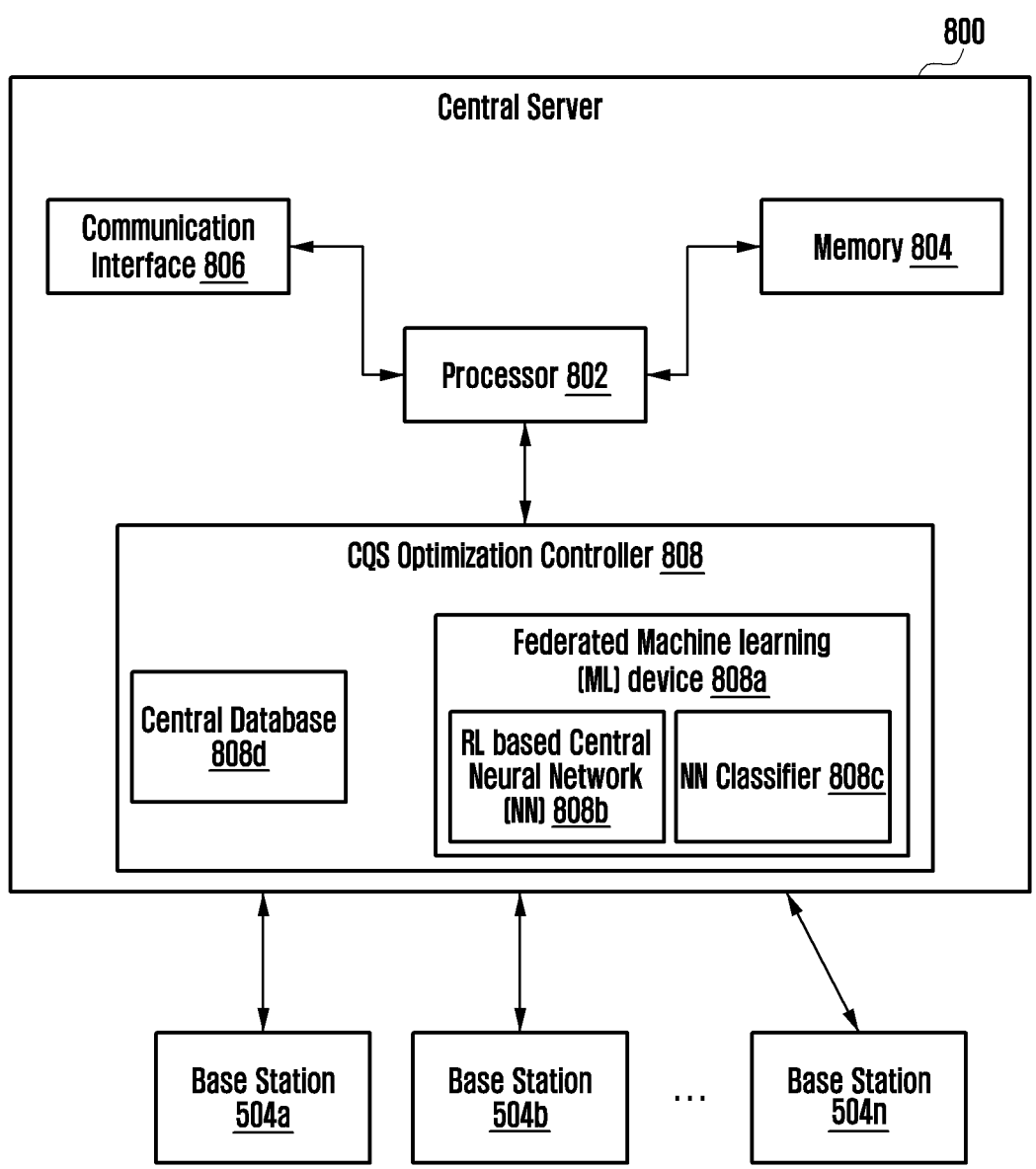
FIG. 8 illustrates a hardware component diagram of a central server for generating an optimal central neural network for each base station, according to an embodiment of the disclosure.

FIG. 8 illustrates a hardware component diagram of a central server (800) for generating an optimal central neural network for each base station (504) according to an embodiment of the disclosure.

Referring to FIG. 8, the central server (800) includes a processor (802), a communication interface (806), a memory (804), and a CQS optimization controller (808). The CQS optimization controller (808) includes a federated machine learning (ML) device (808a) which comprises a NN classifier (808c) and the RL based optimal central NN (808b), and a central database (808d).

The components of the central server (800) provided herein may not be exhaustive and that the central server (800) may include more or fewer components than that of depicted in FIG. 8. Further, two or more components may be embodied in one single component, and/or one component may be configured using multiple sub-components to achieve the desired functionalities. Some components of the central server (800) may be configured using hardware elements, firmware elements and/or a combination thereof.

The processor (802) is coupled with the memory (804), the communication interface (806), and the CQS optimization controller (808). The processor (802) is configured to execute instructions stored in the memory (804) and to perform various processes. The communication interface (806) is configured for communicating internally between internal hardware components and with external devices via one or more networks. The processor (802) may include one or more processing units (e.g., in a multi-core configuration).

The memory (804) stores instructions to be executed by the processor (802). The memory (804) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (804) may, in some examples, be considered a non-transitory storage medium. The term "non-transitory" may indicate that the storage medium is not embodied in a carrier wave or a propagated signal. However, the term "non-transitory" should not be interpreted that the memory (804) is non-movable. In certain examples, a non-transitory storage medium may store data that can, over time, change (e.g., in random access memory (RAM) or cache).

In an embodiment of the disclosure, the processor (802) is configured to classify, using the NN classifier (808c), each BS (504) into a group of BSs based on similar working environment (618b) of the BSs, for example, a frequency bandwidth of the BSs, a user load associated with each BS classified in the group of BSs. The classify mechanisms are applicable for all split options provided by 3GPP and all architectures. One can use standard or non-standard mechanism to convey the information using enum or data structure or similar existing mechanism.

For example, but not limited to, if there are 4 base stations—BS1, BS2, BS3 and BS4, then (BS1, BS4) are grouped together and (BS2, BS3) are grouped to form the other group, determine a CQS information related to unknown frequency bands while communicating to the UE (502a). The processor (702) is further configured to learn to correctly identify, using the NN classifier ((808c), the optimal RL based central NN (808b) (interchangeably may also be referred as "optimal central NN (808b)") for each BS (504) based on the BS parameters. Upon classification of each BS (504) into a respective group of BSs, the process (802) is further configured to receive, via the communication interface (806), an optimal weight of each NN node of the RL based local NN (714a) from each BS (504) of the group of BSs (504). The processor (802) is further configured to determine, using the federated ML device (808a), the optimal RL based central NN (808b) to be deployed at each BS (504) of the group of BSs using federated learning based on the received optimal weight of each NN node of the RL based local NN model (714a) from each BS (504) of the group of BSs. The processor (802) is further configured to send the optimal central NN (808b) to each BS (504) of the group of BSs, and receive feedback related to performance of the optimal central NN (808b) from each BS (504), and accordingly update the optimal central NN (808b) based on the received feedback.

In an embodiment of the disclosure, each BS (504) will take different time to train the RL based local NN (714a) for a fixed number of iterations. This depends on the dataset size and processing power available at the BS. The central server (800) will wait for a minimum number of BS to respond back with the trained RL based local NN (714a) before applying federated machine learning to generate the RL based optimal central NN (808b). Some BS may have responded late to the central server (800). Some of the BS (504) might have a better trained RL based local NN (714a) with low error. In that case the central server (800) will again do the federated machine learning to generate the RL based optimal central NN (808b). This allows the RL based optimal central NN (808b) with high accuracy.

In an embodiment of the disclosure, if the BS parameters of any BS (504) are changed, then a new classification is done for the BS in order to classify the BS (504) into an appropriate BS group and further according to the new classification of the BS (504) a new RL based optimal central NN (808b) is broadcasted to the BS (504) from the central server (800).

In an embodiment of the disclosure, for each positive feedback from the BS (504), a reward will be given depending on the RL based optimal central NN accuracy and size of the data on which it is trained. The central server (800) maintains a look up table in the central database (808d), mapping each BS with the current accumulated reward. While carrying out the federated virtualized radio access network (vran) learning to generate the RL based optimal central NN (808b), the central server (800) takes weighted average of weights of layers of each RL based local NN (714a) from each BS (504). Further, the federated learning is designed such that all the remaining BSs are of the same or similar type of BSs. In an example, the BSs can operate in same frequency band etc. The federated learning can be done from different BSs which are operating in different frequencies. The federated learning across the beam or/and BWP or/and BW can be done. In an example, the BS (104) can learn the CQI distribution of a user based on user location, other user parameters and network parameters etc. If a new UE enters in nearby region then BS (104) can apply learning of other UEs on new UEs which has similar UE capabilities, UE transmission mode, operating frequency and other UE/BS parameters. The federated learning across the BSs can be done with case as multiple BSs can be run in the cloud. In an example, one can exploit the load of the other BSs, interference maps, coverage maps, coverage holes maps, MCS map, channel conditions maps etc. to estimate the CQI values using ML/AI/NN. In an example, the method can use some set of network and UE parameters. In another example, the method can use sub-set of parameters to build ML and/or AI techniques.

The method will use federated learning such that all the remaining BSs are of the same or similar type. For example, they can operate in same frequency band etc. The federated learning can be done from different BSs which are operating in different frequencies.

The central database (808d) is configured to store the details related to BS parameters of each BS (504), the plurality of weights associated with layers of each RL based local NN (714a) from each BS (504), and weights of the generated RL based optimal central NN (808b) along with rewards received from each BS (504) related to a performance of the RL based optimal central NN (808b) for predicting CQS information for unknown frequency bands.

It shall be noted that although the explanation of the functions of the central server (800) are given with respect to communication with multiple BS (504) but the central server (800) functionalities are also applicable to multiple UEs (502a) for predicting CQS information related to unknown frequency bands. For example, the central server (800) learns to generate the RL based optimal central NN (808b) based on weights of layers of RL based local NN (912a) at each UE (502a) using federated machine learning, and accordingly can deploy the RL based optimal central NN (808b) to each UE of a group of UEs.

The embodiments disclosed herein can be implemented using at least one hardware device and performing network management functions to control the elements.

Figure 9:
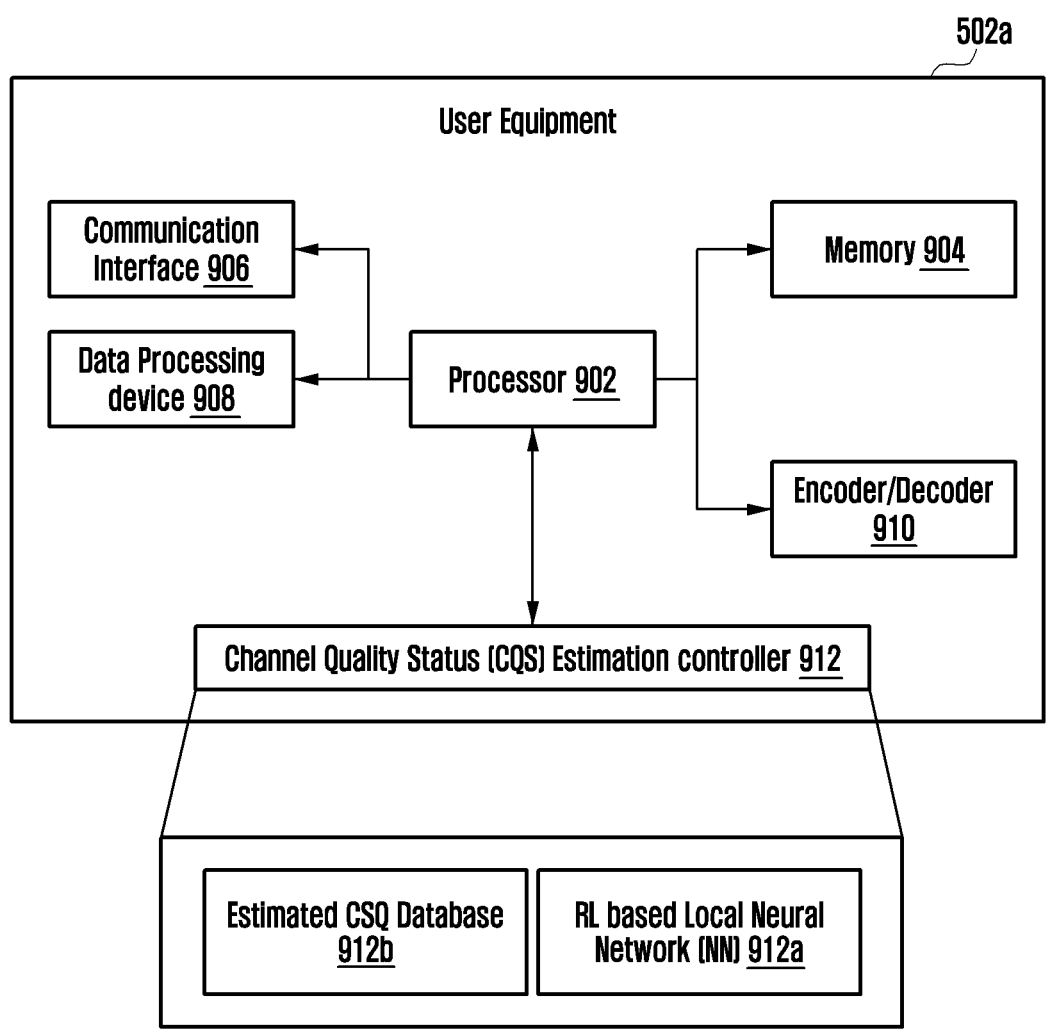
FIG. 9 illustrates a hardware component diagram for a UE for predicting CQS information related to unknown frequency bands, according to an embodiment of the disclosure.

FIG. 9 illustrates a hardware component diagram for UE (502a) for predicting CQS information related to unknown frequency bands according to an embodiment of the disclosure. The UE (502a) is an example of the UEs (502a, 502b, 502c and 502d) shown in FIG. 5.

Referring to FIG. 9, the UE (502a) comprises a processor (902), a memory (904), a communication interface (906), a data processing device (908), a decoder (910), and a CQS estimation controller (912). The CQS estimation controller (912) includes an estimated CQS database (912b) and an RL based local NN (912a). The RL based local NN (912a) is an example of the NN (506). The components of the UE (502a) provided herein may not be exhaustive and that the UE (502a) may include more or fewer components than that of depicted in FIG. 9. Further, two or more components may be embodied in one single component, and/or one component may be configured using multiple sub-components to achieve the desired functionalities. Some components of the UE (502a) may be configured using hardware elements, firmware elements and/or a combination thereof.

The processor (902) is coupled with the memory (904), the communication interface (906), the data processing device (908), the decoder (910), and the CQS estimation controller (912). The processor (902) is configured to execute instructions stored in the memory (904) and to perform various processes. The communication interface (906) is configured for communicating internally between internal hardware components and with external devices via one or more networks. The processor (902) may include one or more processing units (e.g., in a multi-core configuration)

The memory (904) stores instructions to be executed by the processor (902). The memory (904) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (904) may, in some examples, be considered a non-transitory storage medium. The term "non-transitory"

may indicate that the storage medium is not embodied in a carrier wave or a propagated signal. However, the term "non-transitory" should not be interpreted that the memory (904) is non-movable. In some examples, the memory (904) can be configured to store larger amounts of information than the memory. In certain examples, a non-transitory storage medium may store data that can, over time, change (e.g., in random access memory (RAM) or cache).

In an embodiment of the disclosure, the processor (902) is configured to determine a CQS information related to unknown frequency bands based on available CQS information related to known frequency bands using machine learning. The processor (702) is further configured to receive, with the help of the communication interface (906), one or more CQI reports, one or more PMI reports and one or more RI reports associated with at least one first frequency band (may also referred as "known frequency band"). The processor (902) is further configured to extract, with the help of the data processing device (908), the plurality of network parameters associated with the one or more CQI reports, one or more PMI reports and one or more RI reports of the at least one first frequency band. Upon extracting the plurality of network parameters associated with the one or more CQI reports, one or more PMI reports and one or more RI reports of the at least one first frequency band, the processor (902) is configured to determine CQI, PMI and RI of at least second frequency band (may also referred as "unknown frequency bands") using the CQS estimation controller (912).

The CQS estimation controller (912) is configured to predict the CQI, the PMI and the RI of at least second frequency band using the RL based NN (912a) and further configured to store the estimated CQI, the estimated PMI and the estimated RI as estimated CQS in the estimated CQS database (912b). In another embodiment of the disclosure, the BS (504) can configure to estimate the channel on multiple BWP. In addition, the BS (504) can ask the UE (502a) to do the measurements on various frequency bands. The UE (502a) will measure RSSI or RSRQ or RSRP or SINR to the BS (504). For example, the BS (504) will ask measurements, such as A2 or A3. This information can be used to estimate the other band CQS values intelligently using ML/AI techniques. The CQS estimation controller (912) is configured to predict the CQI, the PMI and the RI of at least second frequency band using the RL based NN (912a) based on inputting the plurality of network parameters, extracted from the at least one of the one or more CQI reports, the one or more PMI reports, and the one or more RI reports of the at least one first frequency band, to a plurality of NN nodes of the RL based local NN, determining an optimal weight of each NN node for each BS based on a training mechanism, and training the RL based local NN based on the optimal weight of each NN node of the plurality of NN nodes, and the plurality of network parameters. The optimal weight corresponds to a weight corresponding to which the error function of the RL based local NN is less than a threshold value. The training mechanism is at least one of a belief propagation mechanism, a back-propagation mechanism or an adaptive learning optimization (Adam) mechanism.

The CQS estimation controller (912) is also configured to receive an optimal central NN (808b) from a central server (800) associated with the BS (504) and the UE (502a). The CQS estimation controller (912) is also configured to apply the optimal central NN (808b) to predict the CQI, the PMI and the RI of the at least one second frequency band based on updating weights of the layers of the RL based local NN (912a) with weights of the layers of the optimal central NN (808b). The CQS estimation controller (912) is further configured to determine whether an error function of an output of the updated RL based local NN (912a) decreased after applying the optimal central NN or not. If the error function of the updated RL based local NN (912a) has decreased then the UE (502a) sends a positive feedback to the central server (800) otherwise the UE (502a) sends a negative feedback to the central server (800). The encoder/decoder (910) is configured to decode downlink information received from the BS (504) and send encoded information, for example the predicted CQI, PMI and RI of at least the second frequency band, to the BS (504).

In an embodiment of the disclosure, the predicted CQI, PMI and RI of at least the second frequency band are provided to the BS (504) via the communication interface (906).

The embodiments disclosed herein can be implemented using at least one hardware device and performing network management functions to control the elements.

It shall be noted that although a single BS and single UE are illustrated and explained in the specification but a person skilled in the art would appreciate the fact that more than one BS and more than one UE can also be present in the wireless network (510) without deviating from the scope of the disclosure.

Figure 10:
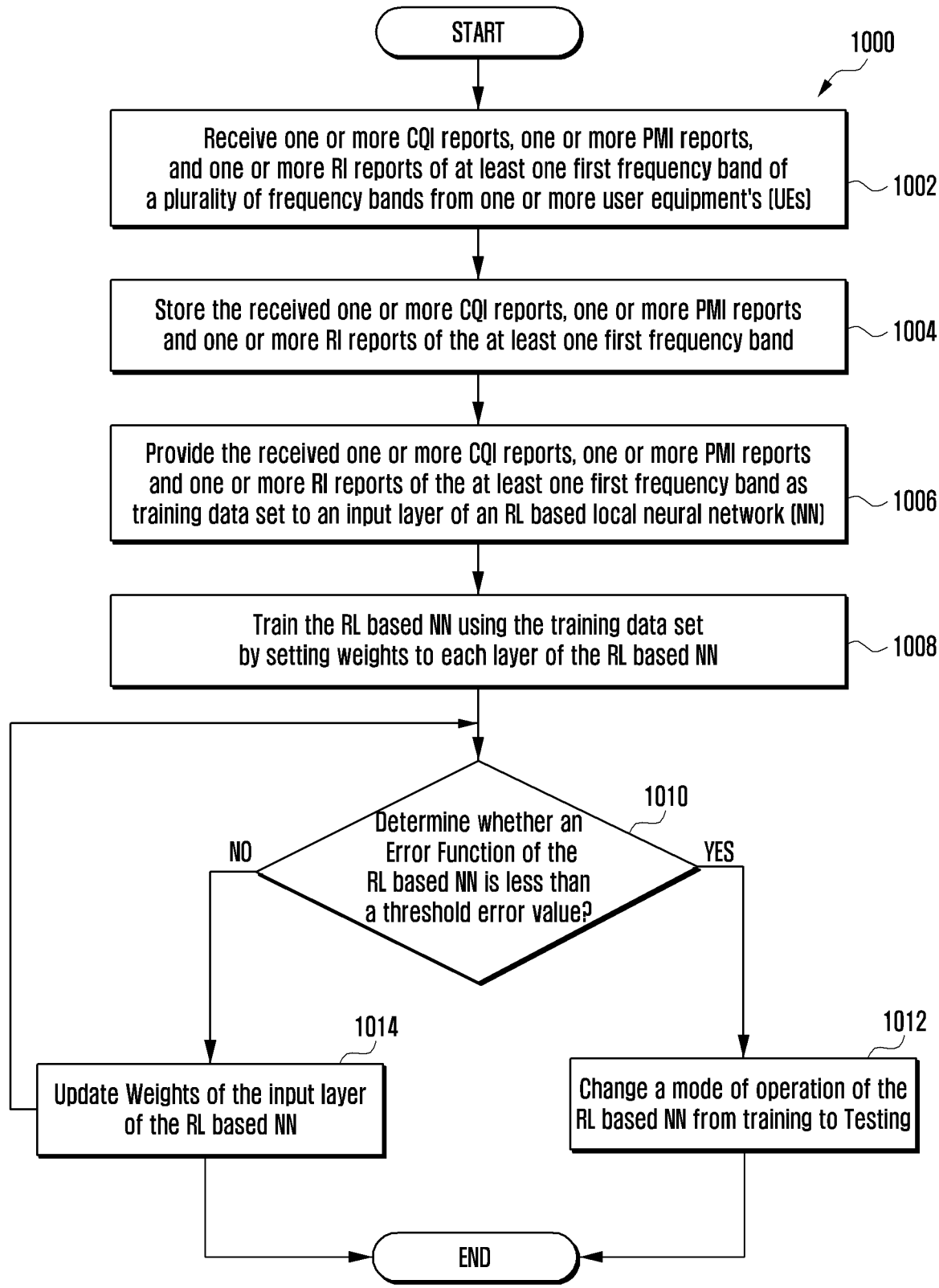
FIG. 10 illustrates a flow chart related to a method for training RL based neural network according to an embodiment of the disclosure.

FIG. 10 illustrates a flowchart related to a method for training an RL based NN according to an embodiment of the disclosure.

Referring to FIG. 10, at operation 1002, a method (1000) includes receiving, by the BS (504), one or more CQI reports, one or more PMI reports, and one or more RI reports of at least one first frequency band of a plurality of frequency bands from one or more user equipment's (UEs).

At operation 1004, the method (1000) includes storing, by the BS (504), the received one or more CQI reports, one or more PMI reports and one or more RI reports of the at least one first frequency band. In an example, in the real time systems, the BS (504) may allocate resources to the UE (502a) in multiple frequency bands and BWP so that the BS (504) can learn the relationship between various BWPs and frequencies. In addition, the BS (504) can also learn from other UEs (502b-502d) which have same properties/category/beam index/data type/same or different transmission mode and other wireless parameters. For example, the UE (502a) operating in frequency band-1 can learn from other UE (502b-502d), which is operating in other frequency band. The BS (504) can apply learning from the UE (502a) on the second UE (502b-502d), when the UE (502b) is operating in frequency band-1. The logic is equally applicable for BWP/bands.

At operation 1006, the method (1000) includes providing, by the BS (504), the received one or more CQI reports, one or more PMI reports and one or more RI reports of the at least one first frequency band as training data set to the input layer (602) of the RL based local NN (506).

At operation 1008, the method (1000) includes training, by the BS (504), the RL based local NN (506) using the training data set by setting weights to each layer (input layer (602), hidden layer (604) and output layer (612)) of the RL based local NN (506).

At operation 1010, the method (1000) includes determining, by the BS (504), whether an error function of the RL based local NN (506) is less than a threshold error value or not. If the error function of the RL based local NN (506) is less than the threshold error value, the method (1000) proceeds to operation 1012 otherwise the method (1000)

proceeds to operation 1014. At operation 1012, the method (1000) includes changing, by the BS (504), a mode of operation of the RL based local NN (506) from training to testing. At operation 1014, the method (1000) includes updating, by the BS (504) the weights of the layers of the RL based local NN (506) in order to decrease the error function of the RL based local NN (506).

The various actions, acts, blocks, steps, or the like in the method (1000) in the flow chart may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 11:
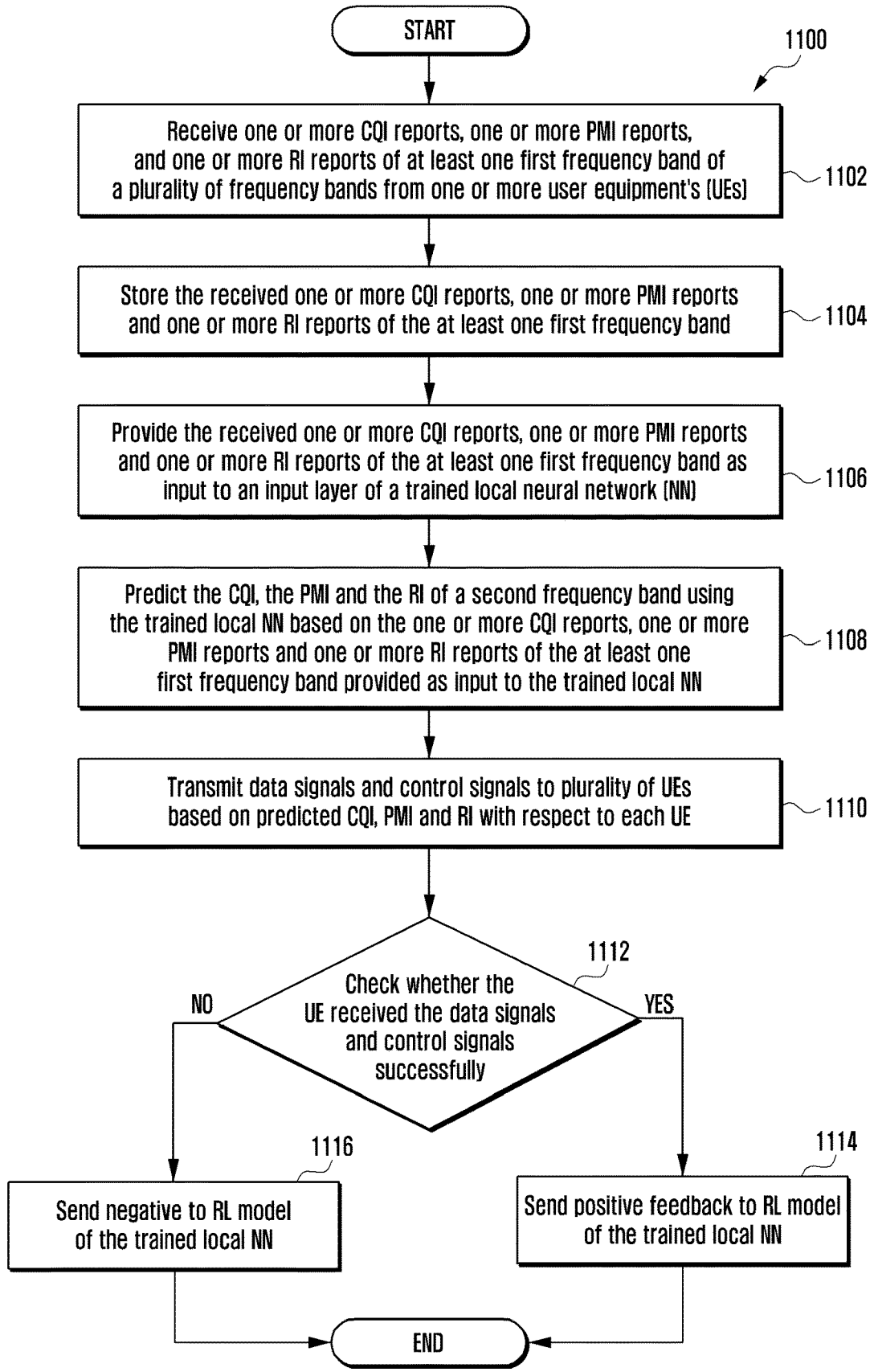
FIG. 11 illustrates a flow chart related to a method for predicting CQS information related to unknown frequency bands using a trained RL based neural network according to an embodiment of the disclosure.

FIG. 11 is a flow chart illustrating a method for predicting CQS information related to unknown frequency bands using trained RL based local NN (506) according to an embodiment of the disclosure. The operations 1102-1116 are performed by the at least one processor (702) of the BS (504).

Referring to FIG. 11, at operation 1102, the method (1100) includes receiving, by the BS (504), one or more CQI reports, one or more PMI reports, and one or more RI reports of at least one first frequency band of a plurality of frequency bands from plurality of UEs (502a).

At operation 1104, the method (1100) includes storing, by the BS (504), the received one or more CQI reports, one or more PMI reports and one or more RI reports of the at least one first frequency band.

At operation 1106, the method (1100) includes providing, by the BS (504), the received one or more CQI reports, one or more PMI reports and one or more RI reports of the at least one first frequency band as input to the input layer (602) of the trained local NN (506).

At operation 1108, the method (1100) includes predicting, by the BS (504), the CQI, the PMI and the RI of a second frequency band using the trained local NN (506) based on the one or more CQI reports, one or more PMI reports and one or more RI reports of the at least one first frequency band provided as input to the trained local NN (506).

At operation 1110, the method (1100) includes transmitting, by the BS (504), data signals and control signals to the plurality of UEs based on predicted CQI, PMI and RI with respect to each UE.

At operation 1112, the method (1100) includes determining, by the BS (504), each UE (502a) received the data signals and control signals successfully or not. If the data signal and control signals are successfully received by the UE (502a), the method (1100) proceeds to operation 1114 otherwise the method (1100) proceeds to operation 1116. At operation 1114, the method (1100) includes sending positive feedback to the RL model (618) of the trained local NN (506).

At operation 1116, the method (1100) includes sending negative feedback to the RL model (618) of the trained local NN (506). In an embodiment of the disclosure, due to over learning, ML/AI module will predict conservative CQI values. In order to avoid this problem, the proposed method utilizes a random aggressive prediction mechanism with certain probability. This way, the proposed method can avoid conservative CQI estimation problem. Introducing randomized algorithms are beneficial to the network. This aggressive CQI predication will capture randomness in the network.

The various actions, acts, blocks, steps, or the like in the flow chart method (1100) may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 12:
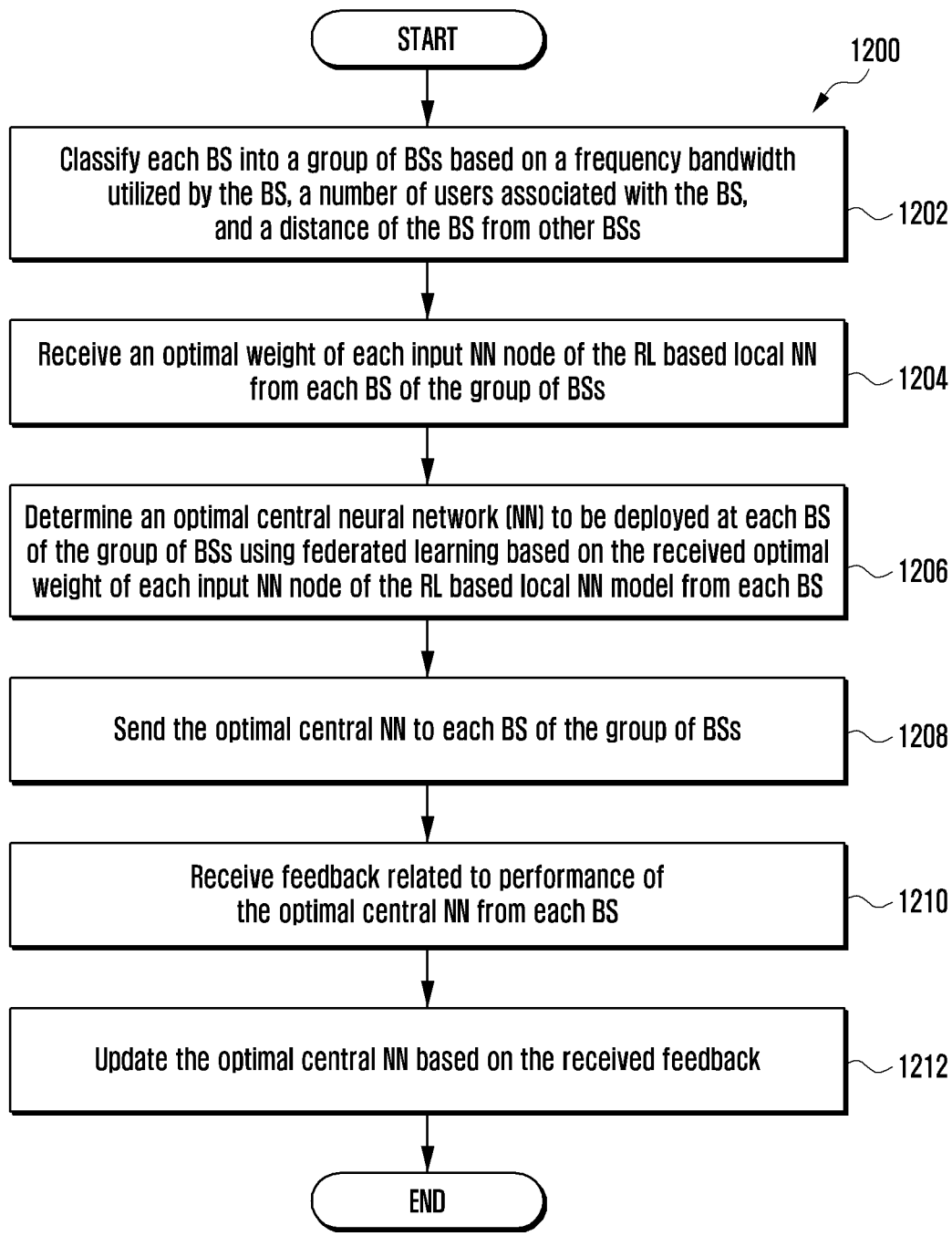
FIG. 12 illustrates a flow chart related to a method for generating optimal central neural network for each BS by a central server according to an embodiment of the disclosure.

FIG. 12 is a flow chart illustrating a method for generating an RL based optimal central NN (808b) for each BS (504) by a central server (800) according to an embodiment of the disclosure. The operations 1202-1212 are performed by the at least one processor (802) of the central server (800).

Referring to FIG. 12, at operation 1202, the method (1200) includes classifying, by the central server (800), each BS (504) into a group of BSs based on a frequency bandwidth utilized by the BS (504), a number of users associated with the BS (504), and a distance of the BS (504) from other BSs.

At operation 1204, the method (1200) includes receiving, by the central server (800), an optimal weight of each NN node (602) of the RL based local NN (506) from each BS (504) of the group of BSs.

At operation 1206, the method (1200) includes determining, by the central server (800), the optimal central NN (808b) to be deployed at each BS (504) of the group of BSs using federated learning based on the received optimal weight of each NN node (602) of the RL based local NN (506) from each BS (504).

At operation 1208, the method (1200) includes sending, by the central server (800), the optimal central NN (808b) to each BS (504) of the group of BSs.

At operation 1210, the method (1200) includes receiving, by the central server (800), a feedback related to performance of the optimal central NN (808b) from each BS (504).

At operation 1212, the method (1200) includes updating, by the central server (800), the optimal central NN (808b) based on the received feedback.

The ML/AI network parameters can be updated either periodically or aperiodically or on a request basis. The learning can be translated into offline or rule based formulas. The learning can be done combination of online-offline and rule based procedure (i.e., hybrid procedure). Even BS (504) can run the ML/AI techniques periodically or aperiodically. For example, if the error is more than x % then re-learning can be done. Even, the BS (504) can request for other BSs NN/ML/AI. The BS (504) can apply one UE learning on other UEs intelligently exploiting the characteristics, such as location information, beam information, UE capabilities, UE transmission, UE type and other wireless parameters etc. even sub-set of parameters can be used to learn. These learning can be done across the BWPs or Bands etc.

In an embodiment of the disclosure, the ML/AI techniques can run in Intelligence layers in an ORAN systems, such as RIC module. In another embodiment of the disclosure, the techniques can be run in real time or near real time. In another embodiment of the disclosure, the techniques can be run in or centralized/cloud RAN. In another embodiment of the disclosure, the techniques can be in CU or DU or RU or RRH or cloud systems. In another embodiment of the disclosure, the ML/AI module will convey the estimated CQI values to MAC/Physical/L3 layer.

The various actions, acts, blocks, steps, or the like in the flow chart method (1200) may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 13:
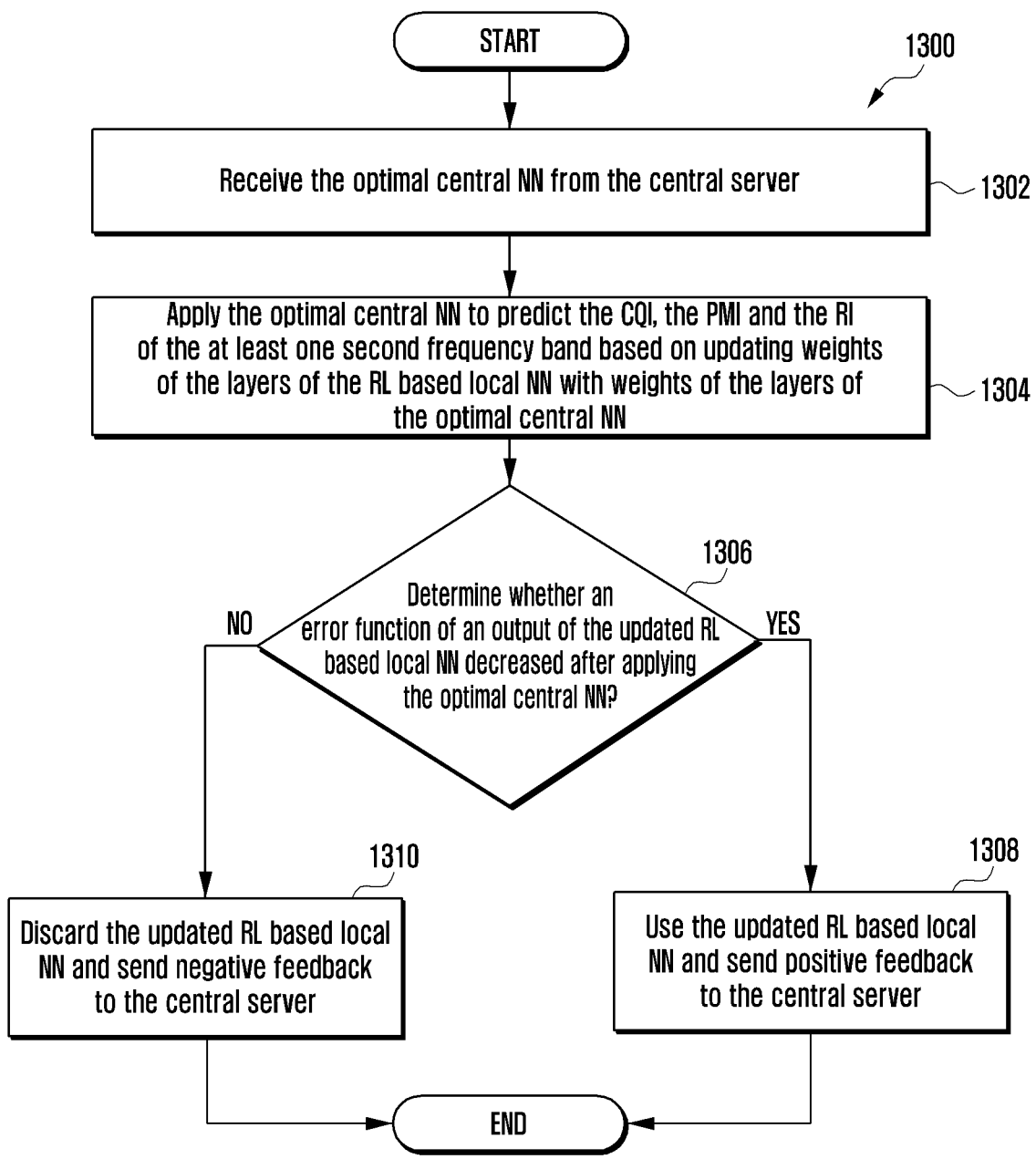
FIG. 13 illustrates a flow chart illustrating a method for applying an optimal central neural network at each BS and determining a performance of the optimal central neural network according to an embodiment of the disclosure.
Figure 14A:
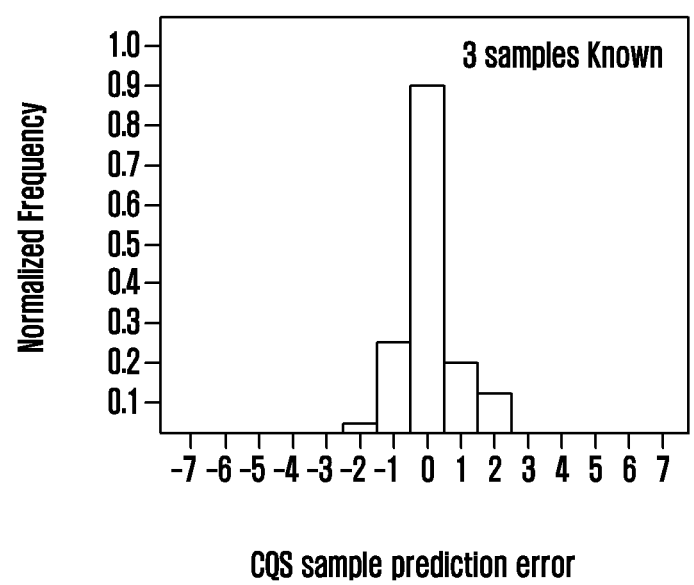
FIG. 14A illustrate different simulation results of an output of an RL based neural network for different number of input parameters given to the RL based neural network according to an embodiment of the disclosure.
Figure 14B:
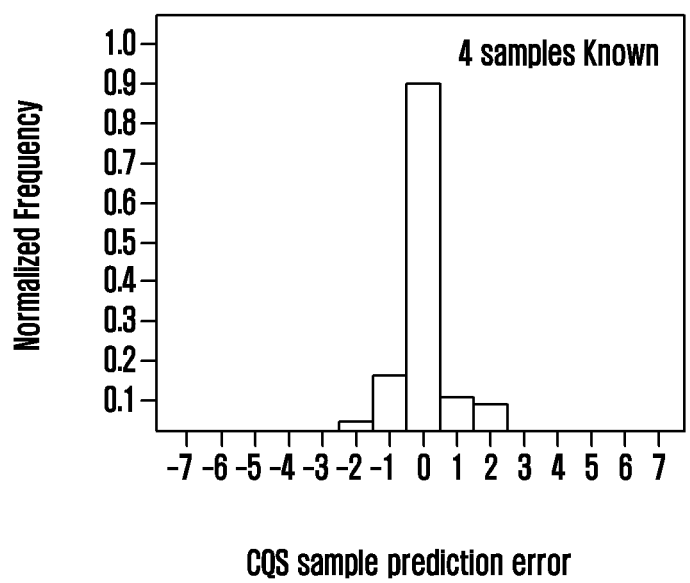
FIG. 14B illustrate different simulation results of an output of a RL based neural network for different number of input parameters given to the RL based neural network according to an embodiment of the disclosure.
Figure 14C:
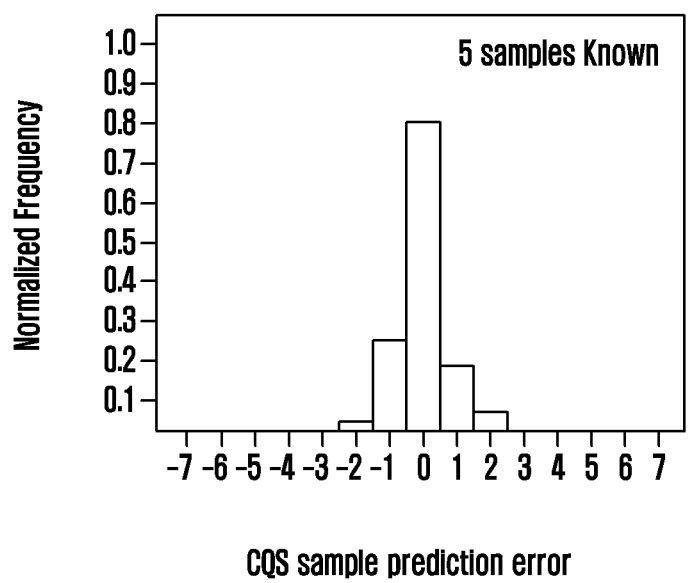
FIG. 14C illustrate different simulation results of an output of an RL based neural network for different number of input parameters given to the RL based neural network according to an embodiment of the disclosure.
Figure 14D:
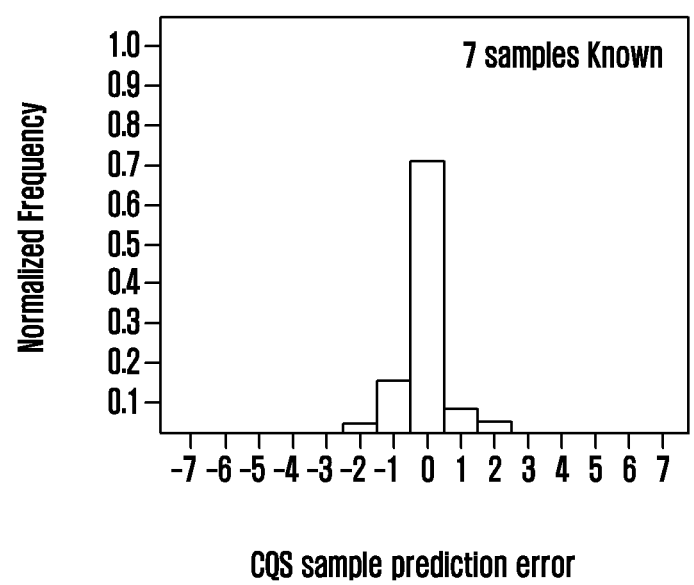
FIG. 14D illustrate different simulation results of an output of an RL based neural network for different number of input parameters given to the RL based neural network according to an embodiment of the disclosure.

FIG. 13 illustrates a flow chart depicting a method for applying an optimal central NN (808b) at each BS (504) and determining a performance of an optimal central NN (808b) according to an embodiment of the disclosure.

Referring to FIG. 13, at operation 1302, a method (1300) includes receiving, by the BS (504), the optimal central NN (808b) from the central server (800).

At operation 1304, the method (1300) includes applying, by the BS (504), the optimal central NN (808b) to predict the CQI, the PMI and the RI of the at least one second frequency band based on updating weights of the layers of the RL based local NN (714a) with weights of the layers of the optimal central NN (808b).

At operation 1306, the method (1300) includes determining, by the BS (504), whether an error function of an output of the updated RL based local NN (714a) decreased after applying the optimal central NN (808b) or not. If the error function of the output of the updated RL based local NN (714a) decreased after applying the optimal central NN (808b), the method (1300) proceeds towards operation 1308, otherwise the method (1300) proceeds towards operation 1310. At operation 1308, the method (1300) includes using, by the BS (504), the updated RL based local NN (714a) and send positive feedback to the central server (800). At operation 1310, the method (1300) includes discarding, by the BS (504), the updated RL based local NN and send negative feedback to the central server (800).

The various actions, acts, blocks, steps, or the like in the method (1300) in the flow chart may be performed in the order presented, in a different order or simultaneously. Further, in some embodiments of the disclosure, some of the actions, acts, blocks, steps, or the like may be omitted, added, modified, skipped, or the like without departing from the scope of the disclosure.

FIGS. 14A, 14B, 14C, and 14D collectively illustrate different simulation results of an output of an RL based neural network for different number of input parameters given to the RL based neural network according to various embodiments of the disclosure.

Referring to FIGS. 14A, 14B, 14C, and 14D, the more number of known samples are given to the NN (506) lesser error performance is observed and hence the more the number of samples are given to the NN (506) better prediction of the CQI, the PMI and the RI of the unknown frequency bands can be achieved.

The implementation of the ML model using RL based NN can be done in different available radio access network (RAN architectures, such as virtual RAN (VRAN) architecture (may also be referred as "cloud RAN"), open RAN (ORAN) and the centralized RAN (CRAN). The examples of implementation of the ML model using RL based NN can be done in CRAN and ORAN is shown in FIGS. 15 and 16 respectively.

Figure 15:
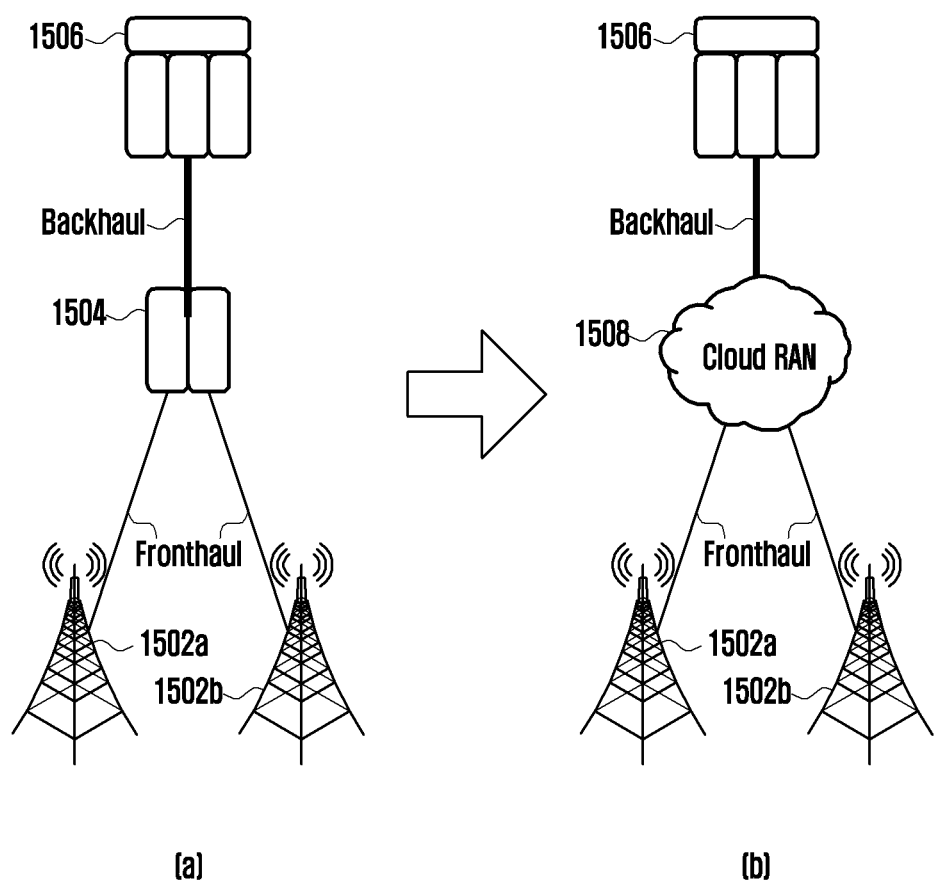
FIG. 15 illustrates an architecture diagram of a cloud radio access network (CRAN) or virtual RAN for predicting CQS information related to unknown frequency bands using a trained RL based neural network according to an embodiment of the disclosure.
Figure 16:
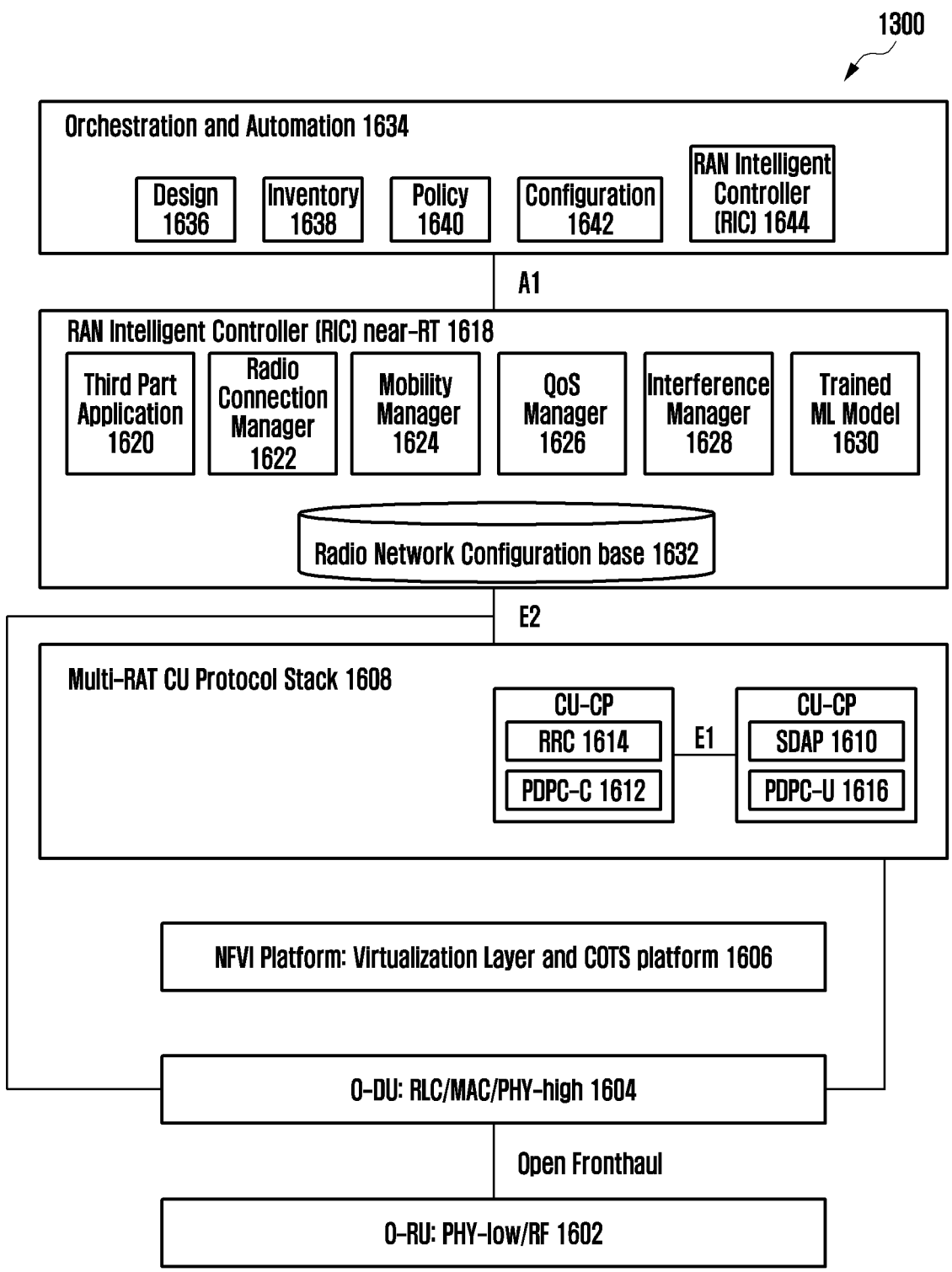
FIG. 16 illustrates an architecture diagram of an open RAN (ORAN) for predicting CQS information related to unknown frequency bands using a trained RL based neural network according to an embodiment of the disclosure.

FIG. 15 illustrates an architecture diagram of CRAN or VRAN for predicting CQS information related to unknown frequency bands using trained RL based NN (506) according to an embodiment of the disclosure.

Referring to FIG. 15, an architecture diagram of the related art of a centralized RAN is shown in part (a) of the FIG. 15. The remote radio head (RRH) units (1502a and 1502b) are connected to baseband units (1504) using a fronthaul. The Baseband units (1504) are linked to a core network (1506) using a backhaul. The RL based local NN (506) is implemented in the Baseband units (1504) to predict CQS information related to unknown frequency bands. The predicted CQS information related to unknown frequency bands is given to a medium access control (MAC) layer of the CRAN and the MAC layer can give the grant without asking the UE (502a).

An architecture diagram of the related art of the VRAN includes the centralized RAN with a network function virtualization (NFV) of the baseband units (1504) in a cloud RAN (1508) is shown in part (b) of the FIG. 15. Instead of the baseband units, the Cloud RAN (1508) is linked to the core network using the backhaul. Further, instead of the baseband units, the RRH units (1502a and 1502b) are connected to the Cloud RAN (1508) using the fronthaul. The core functions of the core network are collocated with the Cloud RAN (1508). The RL based local NN (506) is implemented in the Cloud RAN (1508) to predict the CQS information related to unknown frequency bands. The predicted CQS information related to unknown frequency bands is given to a MAC layer of the VRAN and the MAC layer can give the grant without asking the UE (502a).

FIG. 16 illustrates an architecture diagram (1600) of an ORAN to predict CQS information related to unknown frequency bands according to an embodiment of the disclosure.

Referring to FIG. 16, an architecture diagram of the related art of the ORAN is shown, therefore explanation of the functions of the related art of the components (1602-1628, and 1632-1644) of the related art in the ORAN are omitted for the sake of brevity of the specification, and the explanation is focused on use of ML system (1630) using RL based NN (506) inside the RAN intelligent controller (RIC) non-real time (non-RT) unit (1618) of the ORAN. The ML system (1630) intelligently predicts at least one of a channel quality indicator (CQI), a pre-coding matrix index (PMI), and a rank index (RI) associated with at least one second frequency band based on available channel quality indicator (CQI) report, a pre-coding matrix index (PMI) report, and a rank index (RI) report related to at least one first frequency band. Further, the ML system (1630) conveys the information related the channel quality indicator (CQI), the pre-coding matrix index (PMI), and the rank index (RI) associated with at least one second frequency band to the medium access control/radio resource control (MAC/RRC) layers (1604) of the ORAN via an E2 interface. The MAC layer (1604) uses the information regarding the channel quality indicator (CQI), the pre-coding matrix index (PMI), and the rank index (RI) associated with at least one second frequency band, and determine a number of resources and MCS value for allocating the resources to the UE (502a502a). Using the estimated information, the MAC layer (1604) can give grants without asking the UE (502a). In an embodiment of the disclosure, the ML system (1630) triggers dynamic updating of the passive BWPs. Similar to the ORAN, the proposed method can be implemented on the VRAN, the Cloud RAN, a centralized RAN, and any cloud based RAN. A centralized controller and a ML/Artificial Intelligence module is included in all the RAN architectures, where each RAN architecture have different interfaces. Further, the ML/NN/AI modules estimated values will be conveyed to MAC/PHY/L3 modules.

The use of RL based local NN (506) along with optimal central NN (808a) improved the spectral efficiency of the overall wireless network (510) and also reduces the latency of the communication between the BS (504) and the UE (502a). Further, relieving the UE (502a) from CQS reporting for every communication in every TTL reduces the resource consumption, the power consumption and the time consumption of the UE (502a) significantly.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station (BS) in a wireless communication system, the method comprising:
receiving, from at least one user equipment (UE), first channel quality information for a first frequency band, wherein the first channel quality information includes at least one of a channel quality indicator (CQI), a pre-coding matrix index (PMI), or a rank index (RI);
obtaining a plurality of network parameters from the first channel quality information, the plurality of network parameters including a first parameter associated with the first frequency band, a second parameter associated with the UE and the BS, and a third parameter associated with an environmental condition;
applying the plurality of the network parameters to a trained machine learning (ML) model as input data; and
determining second channel quality information for a second frequency band different from the first frequency band based on output data from the trained ML model,
wherein the first parameter includes at least one of a subcarrier spacing or a bandwidth part (BWP) of the first frequency band, the second parameter includes at least one of a number of the at least one UE, an operation mode of the BS, or a transmitting power of the at least one UE, and the third parameter includes at least one of a climate condition or a time of a day.

2. The method of claim 1,
wherein the first frequency band and the second frequency band are one of a sub-band, a wide band, or multi-bands.

3. The method of claim 1, wherein the determining the second channel quality information for the second frequency band comprises:
identifying whether a first output from the trained ML model is less than or equal to a threshold error value;
in case that the first output from the trained ML model is less than or equal to the threshold error value, determining the first output as the output data; and
in case that the first output from the trained ML model is greater than the threshold error value, obtaining second output from the trained ML model based on a weight applied for each of neural network (NN) node of the trained ML model and determining the second output as the output data.

4. The method of claim 3,
wherein an error function of the ML model is updated to have a value less than the threshold error value by the weight.

5. A method performed by a user equipment (UE) in a wireless communication system, the method comprising:
receiving, from a base station (BS), a request for first channel quality information for a first frequency band;
transmitting, to the BS, the first channel quality information for the first frequency band including at least one of a channel quality indicator (CQI), a pre-coding matrix index (PMI), or a rank index (RI); and
receiving, from the BS, information for allocating a resource for a second frequency band different from the first frequency band,
wherein the resource for the second frequency band is allocated based on a second channel quality information for the second frequency band,
wherein the second channel quality information for the second frequency band is determined based on a trained machine learning (ML) model applied with a plurality of network parameters obtained from the first channel quality information, and
wherein a first parameter includes at least one of a subcarrier spacing or a bandwidth part (BWP) of the first frequency band, a second parameter includes at least one of a number of at least one UE, an operation mode of the BS, or a transmitting power of the at least one UE, and a third parameter includes at least one of a climate condition or a time of a day.

6. The method of claim 5,
wherein the first frequency band and the second frequency band are one of a sub-band, a wide band, or multi-bands.

7. The method of claim 5,
wherein the second channel quality information is determined by output data from the trained ML model, and
wherein the output data is determined based on a first output being less than or equal to a threshold error value, or a second output, the second output being obtained based on the first output and a weight applied for each of neural network (NN) node of the trained ML model.

8. The method of claim 7,
wherein an error function of the ML model is updated to have a value less than the threshold error value by the weight.

9. A base station (BS) in a wireless network, the BS comprising:
a memory;
a processor communicatively connected to the memory; and
a channel quality status (CQS) estimation controller communicatively connected to the memory and the processor,
wherein the processor is configured to:
receive, from at least one user equipment (UE), first channel quality information for a first frequency band, wherein the first channel quality information includes at least one of a channel quality indicator (CQI), a pre-coding matrix index (PMI), or a rank index (RI),
obtain a plurality of network parameters from the first channel quality information, the plurality of network parameters including a first parameter associated with the first frequency band, a second parameter associated with the UE and the BS, and a third parameter associated with an environmental condition,
apply the plurality of the network parameters to a trained machine learning (ML) model as input data, and
determine second channel quality information for a second frequency band different from the first frequency band based on output data from the trained ML model, and
wherein the first parameter includes at least one of a subcarrier spacing or a bandwidth part (BWP) of the first frequency band, the second parameter includes at least one of a number of the at least one UE, an operation mode of the BS, or a transmitting power of the at least one UE, and the third parameter includes at least one of a climate condition or a time of a day.

10. The BS of claim 9, wherein the first frequency band and the second frequency band are one of a sub-band, a wide band, or multi-bands.

11. The BS of claim 9, wherein, to determine the second channel quality information for the second frequency band, the processor is further configured to:

identify whether a first output from the trained ML model is less than or equal to a threshold error value, in case that the first output from the trained ML model is less than or equal to the threshold error value, determine the first output as the output data, and in case that the first output from the trained ML model is greater than the threshold error value, obtain second output from the trained ML model based on a weight applied for each of neural network (NN) node of the trained ML model and determining the second output as the output data.

12. The BS of claim 11, wherein an error function of the ML model is updated to have a value less than the threshold error value by the weight.

13. A user equipment (UE) in a wireless network, the UE comprising:

a memory;

a processor communicatively connected to the memory; and a channel quality status (CQS) estimation controller, communicatively connected to the memory and the processor, configured to:

receive, from a base station (BS), a request for first channel quality information for a first frequency band, transmit, to the BS, the first channel quality information for the first frequency band including at least one of a channel quality indicator (CQI), a pre-coding matrix index (PMI), or a rank index (RI), and receive, from the BS, information for allocating a resource for a second frequency band different from the first frequency band, wherein the resource for the second frequency band is allocated based on a second channel quality information for the second frequency band, wherein the second channel quality information for the second frequency band is determined based on a trained machine learning (ML) model applied with a plurality of network parameters obtained from the first channel quality information, and wherein a first parameter includes at least one of a subcarrier spacing or a bandwidth part (BWP) of the first frequency band, a second parameter includes at least one of a number of at least one UE, an operation mode of the BS, or a transmitting power of the at least one UE, and a third parameter includes at least one of a climate condition or a time of a day.

14. The UE of claim 13, wherein the first frequency band and the second frequency band are one of a sub-band, a wide band, or multi-bands.

15. The UE of claim 13, wherein the second channel quality information is determined by output data from the trained ML model, and wherein the output data is determined based on a first output being less than or equal to a threshold error value, or second output, the second output being obtained based on the first output and a weight applied for each of neural network (NN) node of the trained ML model.

16. The UE of claim 15, wherein an error function of the ML model is updated to have a value less than the threshold error value by the weight.

* * * * *